US005617371A

United States Patent [19]

Williams

[11] Patent Number: 5,617,371

[45] Date of Patent: Apr. 1, 1997

[54] METHOD AND APPARATUS FOR ACCURATELY DETERMING THE LOCATION OF SIGNAL TRANSDUCERS IN A PASSIVE SONAR OR OTHER TRANSDUCER ARRAY SYSTEM

[75] Inventor: Jack R. Williams, Anaheim, Calif.

[73] Assignee: Diagnostic/Retrieval Systems, Inc., Oakland, N.J.; a part interest

[21] Appl. No.: 385,442

[22] Filed: Feb. 8, 1995

[51] Int. Cl.[6] ............................... H04B 17/00; G01S 3/80

[52] U.S. Cl. ............................ 367/13; 367/124; 367/127

[58] Field of Search .................................... 367/127, 907, 367/13, 19, 124, 129; 342/118, 132, 165

[56] References Cited

U.S. PATENT DOCUMENTS

| | | | |
|---|---|---|---|
| 4,187,492 | 2/1980 | Delignieres | 367/127 |
| 4,376,301 | 3/1983 | Roberts | 367/19 |
| 4,956,824 | 9/1990 | Sindeband et al. | 367/907 |
| 4,980,870 | 12/1990 | Spivey et al. | 367/121 |
| 5,099,456 | 3/1992 | Wells | 367/127 |
| 5,166,905 | 11/1992 | Currie | 367/19 |

*Primary Examiner*—Daniel T. Pihulic
*Attorney, Agent, or Firm*—Cobrin Gittes & Samuel

[57] ABSTRACT

An apparatus and method for accurately determining the relative locations of sensors in a passive sonar or like monitoring system utilizes two non-parallel (but not necessarily orthogonal) calibrator signals to calculate the relative positions of sensors in a sensor array. Iteration, using a deformed line array constraint, permits reliable solution of the sensor position equations, even when the relative angle between the calibrator signals is initially unknown.

22 Claims, 4 Drawing Sheets

METHOD AND APPARATUS FOR ACCURATELY DETERMING THE LOCATION OF SIGNAL TRANSDUCERS IN A PASSIVE SONAR OR OTHER TRANSDUCER ARRAY SYSTEM

FIELD OF THE INVENTION

The present invention relates generally to the field of signal detecting and measuring systems, particularly those employing arrays of sensors and signal processing apparatus to post-process the signals received from such sensors. More specifically, the invention relates to a method of an apparatus for accurately determining the relative and/or absolute position of individual transducers in such signal-detection systems through the analysis of signals received from sources whose precise bearing is not known.

BACKGROUND OF THE INVENTION

Passive surveillance systems are widely used to detect underwater objects. These systems employ a plurality of individual signal sensors, sometimes as many as 1,000, placed at different locations surrounding the area to be monitored by the system. Because each sensor is situated at a different location, a single signal emanating from a single source will produce slightly different responses at each sensor. For example, sensors which are closer to the source will receive the signal earlier. Generally, the object of a passive surveillance system is to compare and contrast the signals received by individual sensors—looking particularly at the delays between the sensor-received signals—to determine the location of the signal source.

In an ideal environment, determination of the signal source location is a relatively straightforward process, and follows directly from well understood principles of analytic geometry and linear systems theory. Real systems, however, must contend with a variety of factors that substantially complicate the source location process. These factors include background noise (both environmental and system-generated), multi-path interference caused by reflection of the signal off the surface or bottom of the ocean, or simultaneous reception of multiple signals, to name a few.

To improve noise immunity and the ability to perform sophisticated signal-processing of the transducer-received signals, modern passive surveillance systems typically operate by (i) digitally sampling the signals at each transducer, (ii) converting each signal to the frequency domain and (iii) performing some type of statistical correlation analysis utilizing these frequency domain transducer signals. The type of correlation analysis performed varies depending upon the objective to be achieved. For example, U.S. Pat. No. 4,980,870, entitled ARRAY COMPENSATING BEAMFORMER, incorporated herein by reference, describes a passive surveillance system wherein the signals from individual transducers are mathematically combined in a manner that maximizes the reception of signals from a certain direction, and/or minimizes the reception of signals from other directions, so as to act like a highly-directional microphone pointed in the "steering direction." U.S. Pat. No. 5,099,456, entitled PASSIVE LOCATING SYSTEM, incorporated herein by reference, uses a similar frequency-domain digital sampling apparatus, but instead analyzes the individual frequency-domain signals with an aim to ascertain the location of the common source from which these signals emanate.

In all passive surveillance systems, it is assumed that the location, or at least the relative location, of each sensor is known. This sensor location information is required to interpret the sensor-received signals in a meaningful way. Once the system knows the relative location of its sensors and the velocity of signal propagation in the particular medium, the system can anticipate the time it should take for a given signal to propagate (along a particular steering direction) from one sensor to another. By comparing the times at which the signal is actually received at various sensors to the predicted times-of-arrival, the system can determine the direction from which the signal emanates.

Inaccurate information regarding the sensor locations introduces serious errors into the process. Without accurate sensor position information, the system cannot predict the expected delays between sensors along given propagation paths and, as a result, will be unable to accurately compute the signal source location. If the array is instead used in a beam-forming application, the inaccuracy in sensor locations will be reflected as reduced directional specificity in the "beam" and/or reduced detectability of the signals monitored using the beam.

Unfortunately, measuring and maintaining exact sensor locations is not as simple as might appear, at least in the underwater environment. First, the long wavelengths involved often mandate sensor arrays of a mile or more. Clearly, therefore, a fixed, rigid array structure (wherein the relative sensor locations cannot shift) is impractical, or at least highly uneconomical.

Thus, there is a need for a method and apparatus for ascertaining the relative positions of sensors in a passive sonar system, preferably without need for high signal bandwidth in the sensors.

SUMMARY OF THE INVENTION

In light of the above, one object of the invention is an improved method and apparatus for determining the relative positions of a plurality of sensors in a passive monitoring system.

Another object of the invention is a method and apparatus for determining the locations of such sensors without need for expensive hardware.

Still another object of the invention is a method and apparatus for calibrating a passive monitoring system using calibrator signals whose bandwidth is not substantially greater than that of the signals to be monitored.

In accordance with one aspect of the invention, a passive monitoring system is calibrated by computing—preferably through correlation processing—the delays between sensors for each of two non-parallel calibration signals. These delays are used to formulate equations for the sensor positions ("sensor position equations"), where the "unknown" variables are the propagation angles of the calibration signals. Iterative solution, based upon assumptions about the deformation characteristics of the array, is used to find feasible values for the calibration signal angles. Once these angles are determined, the sensor position equations provide orthogonal coordinates, relative to a reference sensor, for each sensor in the array, thereby facilitating beam-forming and other phased array applications.

In accordance with other aspects of the invention, the calibrator signals may comprise sinusoidal signals or wideband signals, such as FM chirps or other broadband noise signals. Sinusoidal signals offer the advantage of not requiring high-bandwidth sensors for calibration purposes, and not requiring a synchronization between transmission of the calibration signal(s) and the sensors and other receiving apparatus which monitor the calibration signals. High-bandwidth calibration signals, on the other hand, offer the advantage of superior multi-path immunity.

BRIEF DESCRIPTION OF THE DRAWINGS AND APPENDICES

The present invention is described in the detailed description below, which description is intended to be read in conjunction with the following set of drawings and appendices, in which.

APP. 1 contains the source code used in a present embodiment of the invention.

DETAILED DESCRIPTION OF THE INVENTION

Figure 1:
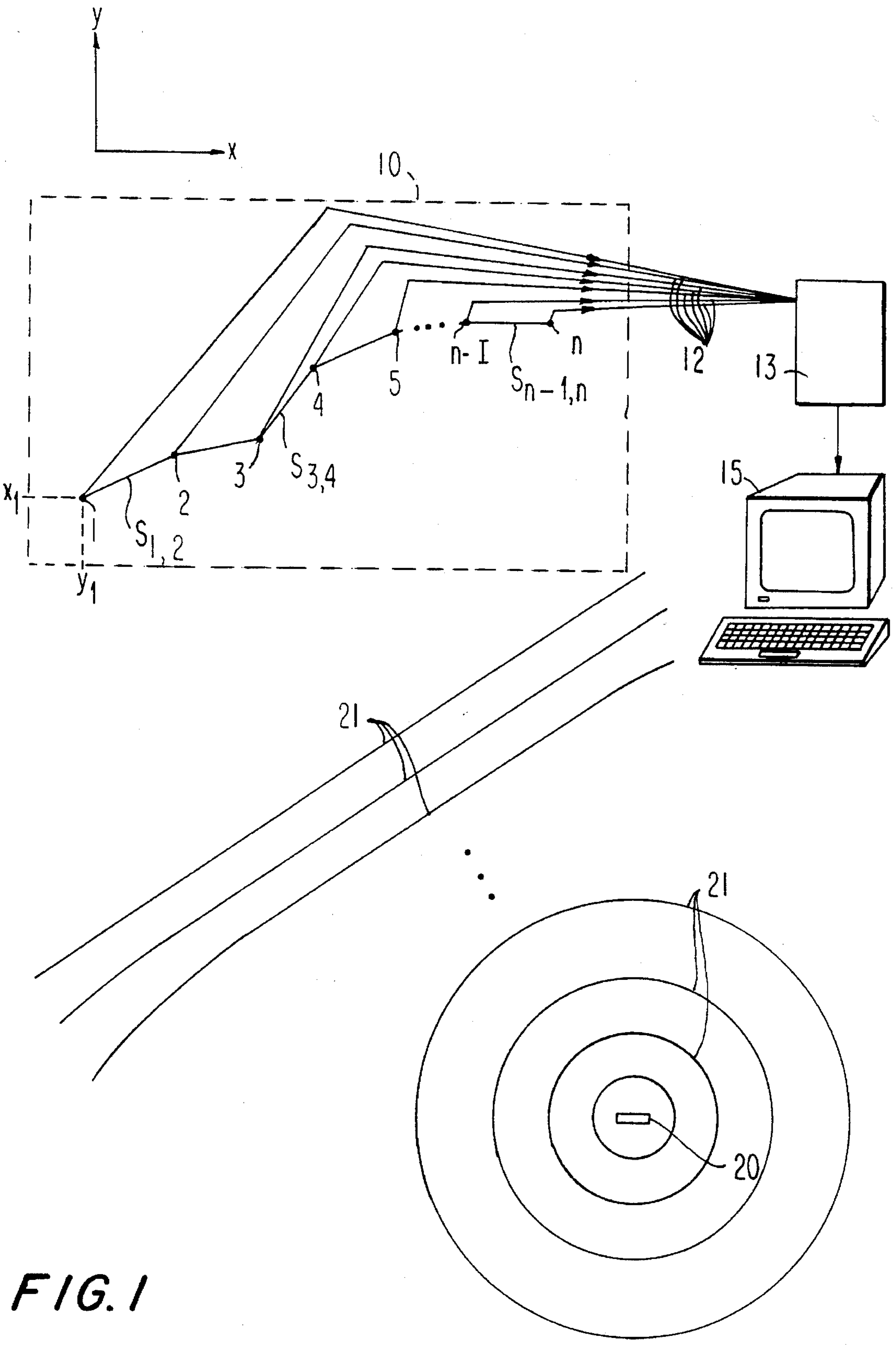
FIG. 1 depicts the overall physical organization of a passive sonar apparatus in accordance with the invention.

Reference is now made to FIG. 1, which depicts the overall structure of a passive sonar apparatus in accordance with the present invention. As depicted, a passive sonar apparatus comprises an array 10 of sensors 1-n, and means 13 for communicating signals 12 received by said sensors to a computer 15, which processes said signals to, among other things, ascertain sensor locations and form beams.

The type of signals 12 which emanate from the sensors and the means 13 for communicating said signals to computer 15 can take many different forms. For example, sensors 10 may be analog transducers, preferably underwater piezoelectric microphones, in which case analog signals 12 are coupled by means 13, which may perform sampling and/or A/D conversion, to computer 15. Alternatively, sampling and/or A/D conversion may be performed at or proximate to the sensors themselves, in which case signals 12 will be of a sampled and/or digital form. It is also possible for means 13 to process—e.g., sample and compute FFT's—signals 12 before communicating said signals to computer 15, thus relieving the processing burden on computer 15. Those skilled in the art will recognize that numerous signal processing boards and chips are available to perform these functions.

Signals 12 may be communicated from sensors 1 to means 13 via any sort of energy pathway, and may be communicated by any means of transmission, including electrical, optical, acoustical, electro-magnetic, magnetic, electro-mechanical, mechanical, or a combination thereof. In a presently preferred embodiment, signals 12 are digitized at the Nyquist frequency, and communicated to the shore using fiber optic cables.

Figure 2:
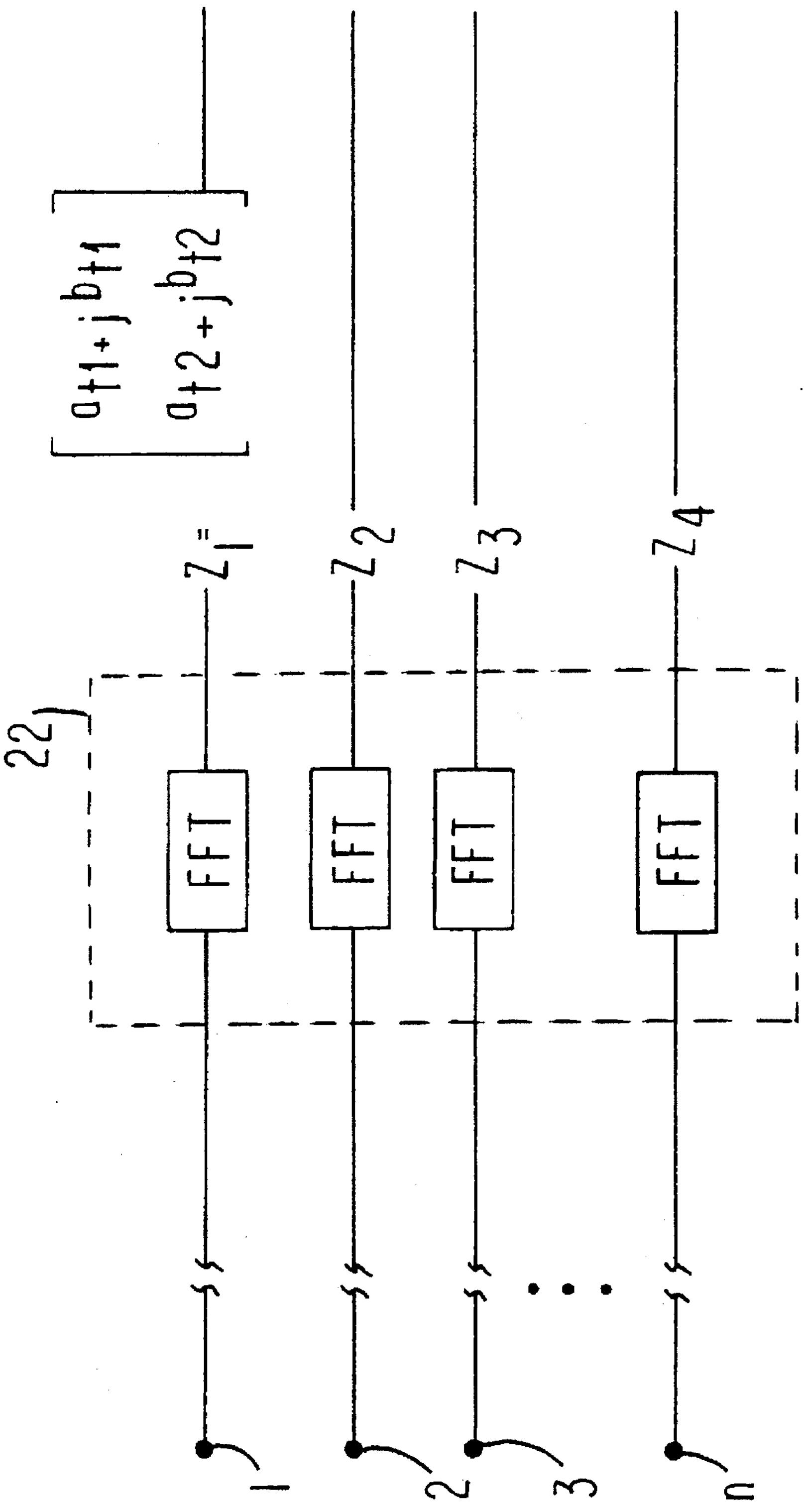
FIG. 2 depicts the process of acquiring input data from the sensors in an apparatus in accordance with the invention.

Reference is now made to FIG. 2, which depicts the input of calibration signals in accordance with the invention. As depicted, signals received by sensors 1-n are provided—by whatever means and in whatever form—to an FFT unit 22, which outputs a plurality of time-sampled FFT coefficient vectors $z_1$–$z_n$, where vector $z_k$ contains the FFT coefficients derived from sensor k. (It is, of course, not required that input data be stored or organized as "vectors"; vector algebra formulations are used merely to facilitate concise description of the sequence of operations performed in accordance with the invention.) FFT unit 22 preferably performs a vernier filtering operation, so as to focus on the frequency of the calibrator signal of interest.

Delay Computation

A preliminary step in the source location process is to convert the narrow-band FFT measurements into relative range delays from sensor 1, which is used as a reference, to other sensors in the array. This delay computation is preferably performed twice, once for each calibrator signal.

Recall that $z_n$ represents a vector, whose elements are a series of FFT coefficients corresponding to the signal received at sensor n at successive time intervals. A complex coherence vector v can be computed as follows:

$$v = \sum_n z_1 z_n'$$

where $z_n'$ represents the complex conjugate transpose of $z_n$. (In theory, the summation operation is not actually necessary, but is preferred since its averaging effect tends to enhance the accuracy of the complex coherence calculation.) The phase delays, in radians, between sensor 1 and sensor n are computed as follows:

$$g=\text{angle}(v)\text{rads}$$

where $g_i$ is the relative phase delay between sensors 1 and sensor i. Because the distance between sensor 1 and i may exceed a wavelength, it is preferable to "unwrap" the phase delays. Unwrapping is performed using an assumption that the phase difference between sensors does not exceed 180 degrees, or, if one or more of the sensors is defective, using a deformed line array assumption, as described below. The MATLAB™ software package provides a routine for performing the preferred unwrapping. The unwrapped phase delays are:

$$q=\text{unwrap}(g)\text{rads}$$

The phase delays q are converted to range delays as follows:

$$r=q(\text{rads})\times\lambda(\text{meters/cycle})/2\pi(\text{rads/cycle})$$

where λ is the wavelength of the calibrator sinusoid. As used below, the range delays from the first calibrator sinusoid are contained in the vector $r_1$, while those from the second appear in the vector $r_2$.

Orthogonal Mapping

Using range-delay vectors $r_1$ (i.e. the range delays, relative to sensor 1, from the first calibrator signal) and $r_2$ (i.e. the range delays for the second calibrator signal), one can formulate "sensor position equations" to determine the sensor positions, relative to sensor 1, in orthogonal x-y coordinates.

Figure 3:
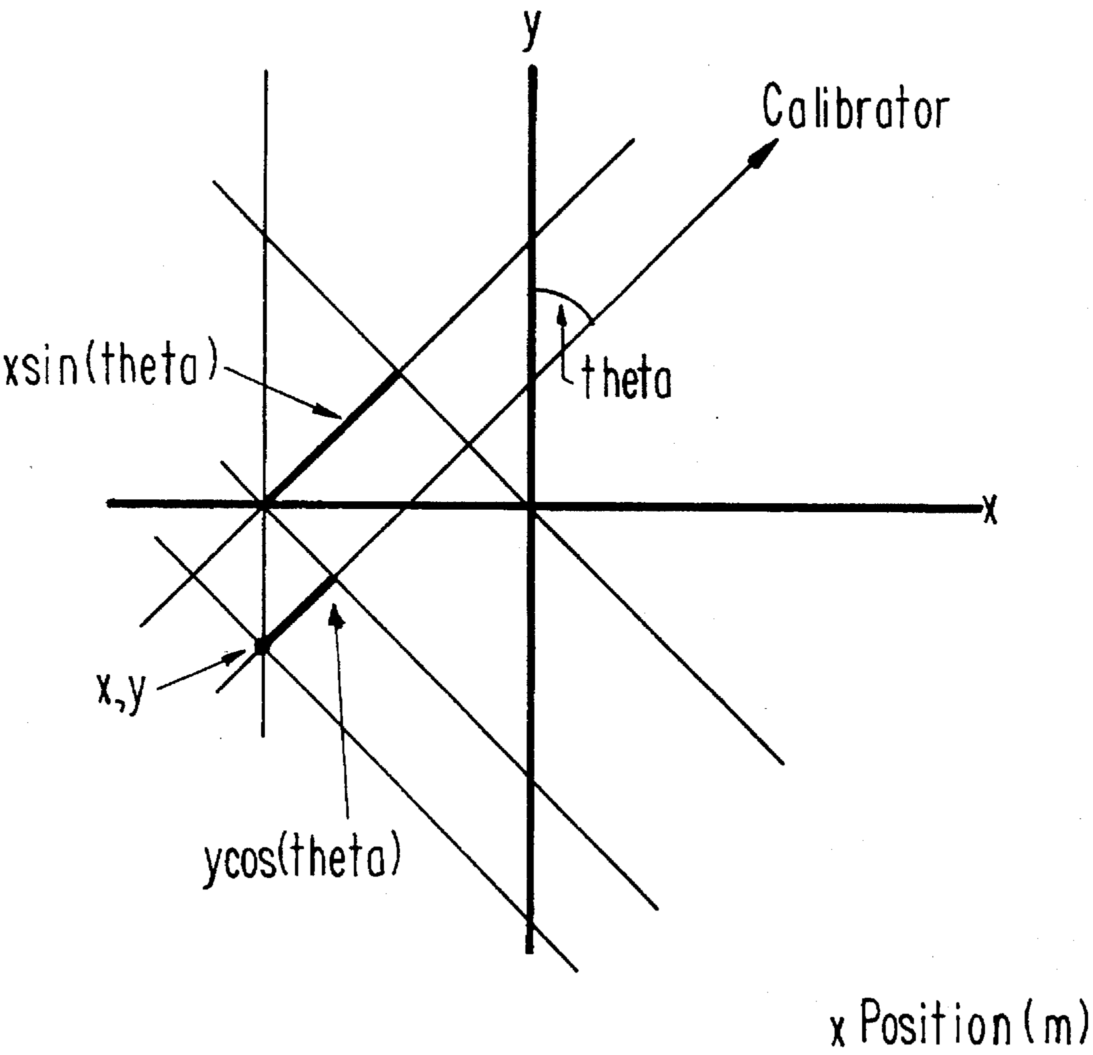
FIG. 3 depicts the geometric configuration from which the sensor position equations are derived.

A vector d contains these sensor positions, where $$d=x+jy$$

and $d_i$ represents the x-y coordinates of sensor i relative to sensor 1. Referring to FIG. 3, and assuming a planar wavefront from each of the calibrators, the following 2n equations for x and y can be specified:

$$r_1=-[\sin(\Theta_1)]x-[\cos(\Theta_1)]y$$

$$r_2=-[\sin(\Theta_2)]x-[\cos(\Theta_2)]y$$

where $\Theta_1$ is the angle from the y-axis to the direction of propagation of the first calibrator and $\Theta_2$ is the angle to the second calibrator. Solving these equations for x and y, one obtains the following sensor position equations:

$$x=[(-r_1/\cos(\Theta_1)\tan(\Theta_2))-r_2/\sin(\Theta_2)]/[1-\tan(\Theta_1)/\tan(\Theta_2)]$$

$$y=-r_1/\cos(\Theta_1)-x\tan(\Theta_1)$$

If $\Theta_1$ and $\Theta_2$ are precisely known, the sensor position equations can be easily solved by well-known techniques to provide the relative x-y coordinates of the sensors. In actual underwater environments, however, $\Theta_1$ and $\Theta_2$ typically vary 0 to 15 degrees from the expected values, thus causing traditional solution techniques to diverge. Iteration provides a practical means for solving these equations.

Iterative Solution of Position Equations

Without accurate values for $\Theta_1$ and $\Theta_2$, the x and y equations do not accurately predict the relative x-y locations of the sensors. Thus, iteration is used to find values for $\Theta_1$ and $\Theta_2$ which, when applied in the x and y equations, yield accurate sensor location results. The difficulty, even with iteration, is knowing whether a proposed set of $\Theta_1/\Theta_2$ values yields accurate x-y sensor locations when the "actual" sensor locations are unknown. In accordance with the invention, use of a deformed line-array constraint allows the sensor position equations to be solved iteratively, at least for most cases of practical interest.

The deformed line-array constraint can be explained with reference to FIG. 1. It assumes that sensors 1-n are distributed along a line, which may be straight or (as depicted) deformed, with bends at the sensor locations. As illustrated, there is a segment $S_{k,k+1}$ between sensors k and (k+1). The deformed line-array constraint assumes that these individual segments are straight. With this assumption, it is apparent that the distance between adjacent sensors remains constant; these distances are simply the length of the segments connecting the sensors, since the individual segments are assumed to be straight. Since the individual segment lengths remain constant, so does the total length of all segments. It is this total length, which is known a priori, that is used to guide the iterative process using the deformed line-array assumption.

The deformed line-array constraint can be mathematically expressed as follows. Assuming some estimated $\Theta_1$ and $\Theta_2$, one can use the previously described x and y equations to derive a vector of estimated sensor positions d=x+jy, where d depends upon the $\Theta_1$ and $\Theta_2$ estimates, and the measured range delays $r_1$ and $r_2$. Using these estimated sensor positions d, total line length (assuming a deformed line array) can be computed as follows:

$$\underline{D}=\sum_{i=1}^{n-1}|\underline{d}_{i+1}-\underline{d}_i|$$

where $d_i$ is the estimated position of sensor i. The difference between this estimated line length D, and the actual line length D, is used to guide the iteration process. Although this deformed line array assumption does not perfectly model the physical geometry of the system, it yields acceptable results, even in the face of one or more severe deformations.

Figure 4:
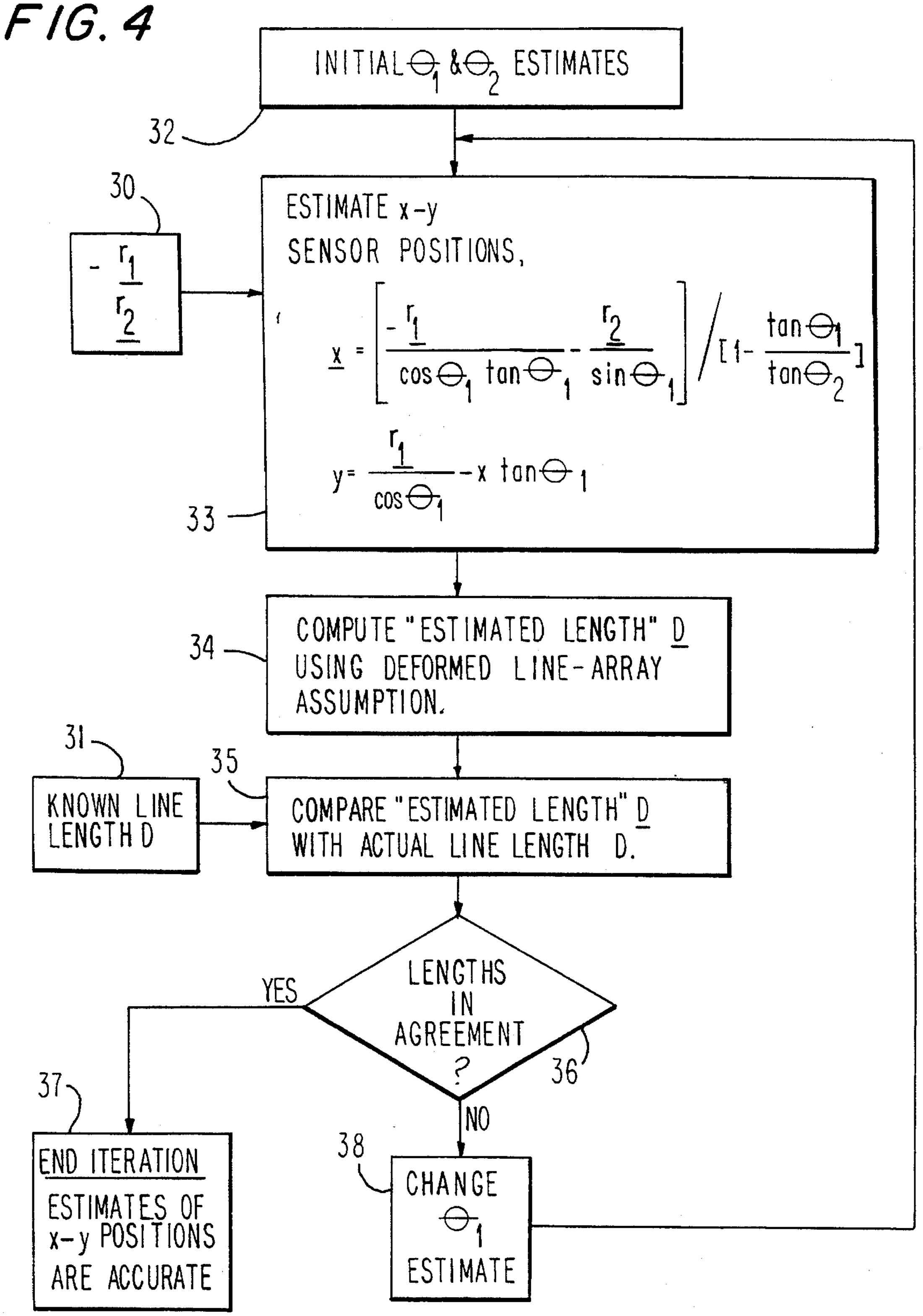
FIG. 4 depicts the iteration process used to solve the sensor position equations.

Reference is now made to FIG. 4, which shows a flowchart of the iteration process. Iteration begins with initial calibrator angle $\Theta_1/\Theta_2$, estimates 32, and iterates to converge on a mathematically consistent value for $\Theta_1$. Field tests reveal that the initial estimates typically vary about 0–15 degrees from the actual values. A position estimation step 33 computes "estimated" sensor positions using the calibrator angle estimates and the measured range delays 30. Step 34 computes the total estimated length D of the array, using the deformed line-array assumption and the sensor position estimates computed in step 33. Step 35 compares the estimated length D to the actual line length D. Based on this comparison, step 36 makes a determination whether the sensor position estimates are accurate, in which case the iteration ends at step 37, or whether additional iteration is desirable, in which case step 38 modifies the estimate of calibrator angle $\Theta_1$ and the iteration process returns to position estimation step 33.

Estimate modification step 38 operates by comparing the "errors" (i.e., the difference between the estimated and actual lengths, D—D) for the current iteration to that from the previous iteration to determine an appropriate modification for the $\Theta_1$ estimate. Those skilled in the art will recognize that this $\Theta_1$ update can be computed using a number of well-know techniques, such as adding or subtracting fixed angular increments according to the sign of the error, or updating according to the slope (or gradient) of the error function. Preferably, angular estimate updating is performed using knowledge about the nominal shape of the error function (or its transfer function), which permits convergence in approximately nine iterations.

Once the error is within acceptable bounds, final orthogonal positions of the sensors are computed, and the array is calibrated for operation.

Use of FM Chirps or Wideband Noise

If bandwidth and other constraints permit, one can employ FM chirp or other wideband noise type calibrator signals instead of sinusoids. With such signals, the delay computation step is performed by cross-correlating the sensor-1 waveform with respective waveforms at each other sensor to determine the relative time delays; no FFT processing or phase unwrapping is required. Since velocity is known, these time delays are easily converted into range delays, from which the invention further operates as described above.

Source Code

To ensure complete satisfaction of the disclosure obligations under 35 U.S.C. §112, attached APP. 1 contains a listing of the source code utilized in connection with a present embodiment of the invention. This source code is written in the MATLAB™ language, which permits compact expression of the required mathematical computations. (Of course, those skilled in the art will recognize that the invention could alternatively be implemented using a wide variety of available programming languages or, if desired, entirely in hardware.)

APP. 1 contains the following five sub-modules:

(1) pa2×1 a.m: CPL Measurements Start (pages 1-1 to 1-9). This is essentially a data input module for collecting and storing samples of the sinusoidal calibrator signals.

(2) pax1b.m: CPL Measurements End (pages 2-1 to 2-8): This module, among other things, calculates the phase delays, and converts these into range delays for use in the mapping process.

(3) pax2.m: CPL X-Y Map Iteration (pages 3-1 to 3-8): This module performs the iterative sensor position estimation.

(4) pa2×3.m: CPL Polar Mapping (pages 4-1 to 4-5): This module converts the computed relative x-y sensor positions to polar coordinates oriented to true North.

(5) paxfm.m: FM Range Delay Measurement (pages 5-1 to 5-4): This is an alternative to modules (1)–(2); it computes range delays using FM chirp or other broadband noise type calibrator signals.

08/385442

Please Print N 9-5-96

Appendix 1

```
%   pa2x1a Program
%                  PHONE LOCATION SYSTEM (PLS)
%        This program consists of the Coherence Phone Location
%(CPL)system and the Frequency Modulation Location System
%(FMCL).  The first uses the coherence of a pair of sinusoid
%sources to relatively locate ocean bottom phones sufficiently
%accurate for beamforming and the second can use a pair of
%FM sources for correlation measurements instead of the
%sinusoids.  The measurement output is a vector of relative
%range delays to each sensor from each of the two sources.
%  The vectors then enter the mapping algorithm
%which converts non-orthogonal two-dimensional measurements
%into x-y positions. The program iterates the x-y solution
%to correct for errors in in the two calibration
%sources. The x-y map is then oriented in polar
%coordinates to true North.  The CPL sources can be deployed
%signal generators or narrowband signals on ships or targets
%of opportunity which may be passing the sensor array.
%        The FMPL method measures the difference in range
%delays relative to the wideband FM chirp received on Phone #1
%by finding the cross correlation between the wideband signal
%on Phone #1 and the other phones.  Similarly, the correlation
%can be based on any wideband signal such as the noise of a
%small boat, a ship, etc. A test boat can therefore be
%a convenient source for the range delay measurements.

%        The five programs named below constitute the CPL and FM
%measurement system, the x-y iteration,  and the mapping
%algorithm. A vector of FM range delay measurements would be
%entered into the x-y iteration and mapping algorithm exactly
%the same as the CPL range delay measurements.
   % 1.    pa2x1a.m    CPL Measurements Start.
   % 2.    pa2x1b.m    CPL Measurements End.
   % 3.    pa2x2.m     CPL x-y Map Iterations.
   % 4.    pa2x3.m     CPL Polar Map.
   % 5.    pa2xfm.m    FM Range Delay Measurements. This is an alternate
%                         to the CPL measurements (FMPL).  The FMPL
%                         sequence is this measurement program used
%                         on two FM projectors or any broadband noise
%                         generators for two range delay measurement
%                         vectors followed by the CPL x-y Map
%                         Iterations and the CPL Polar Map.

%.........................................................
clg
figure(1)

clear

%       Coherence Range Delay Measurement Program.
%  This is part of PLS by Jack R. Williams.
%  This program is in Matlab for pc/windows; The Math Works.
%  This program accepts dual fft coefficient input data
%  matrix from a saved file (such as sdx002 file) or generates
%  its own test
%  matrix by simulating the measurements.  Coherence time
%  delay measurements are made, then converted to range
%  delays.  The results are output in the command window.
%
%  This shows fft of signal on phone1.  It shows the
%  phase and range delays with phone 1
%  as the reference phone.  Printouts of these functions
%  can be made from the command window.
%  Choose 1) test sig, or 2) file following operator prompt.

%.............................................
% For running, you must turn select the test signal already set up or change
% it.  Or, select the proper array just below.  For new arrays, the
% data below must be used to generate a template design which
% selects the processor channels.  A template must be generated
% with virtual sensors for missing sensors to satisfay Nyquist for
% phase unwrap.  This is done just below and after the series of
% end statements for both the first and second file to be used.

%.............................................
```

Program Page 1-1

08/385442

```
clear
tim = fix(clock);
tim = fix(clock);  day = tim(3);  ds = num2str(day);mo = tim(2);
mos = num2str(mo);  yr = tim(1);  yrs = num2str(yr);
date = ['d' ds '-' mos '-' yrs];
timehr = tim(4);  xtimehr = num2str(timehr);
timemin = tim(5);  xtimemin = num2str(timemin);
time2 = [date ' ' xtimehr ':' xtimemin];
disp('')
disp('')
timex =['acov7MJCx5...........................;   ' time2];
disp(timex) .
%.....................................................
%xxxxxxxxxxxxxxxxxxxxxxxxxxxxxxxxxxxxxxxxxxxxxxxxxxxxxxxxxxxxxxxxxxxxxxxxxxxxxx
%This selects the test signal

gensig = 0   %gensig=1 for test sig; =0 for data
              %must put on proper array

input10 = input('(Test sig? & array size? ,e.g. 32; Return=no)')
   if input10 ~= []
   gensig = 1;
   N = input10
   Nin = N;
    insensors1 = [1:N  ];
    NN1 = max(size(insensors1));

clear insensors1
insensors1 = [1:5  8:N];
sensorson = [  1 1 1 1 1   0 0    ones(size(8:N))];

    N = max(size(insensors1))
        d = 1.1719
    D = d.*(max(size(insensors1)-1)+2)
   proj1 = [0]
   proj2 = [ 90]

end %input10

%xxxxxxxxxxxxxxxxxxxxxxxxxxxxxxxxxxxxxxxxxxxxxxxxxxxxxxxxxxxxx
%xxxxxxxxxxxxxxxxxxxxxxxxxxxxxxxxxxxxxxxxxxxxxxxxxxxxxxxxxxxxx

% Array Design Selection;
% Must Use only one = 1, all others must be = 0; else error
%for any sensor array, you must enter 1)name,2)insensors1,3)sensorson

if gensig == 0

 arraylehf  =  0 ;    %38 phones
 arraylehfsd6  = 1;   %   %data with 31 of 38 phones
 arraylehfsd6tst1  =  0;  %test: drop 8 sensors node + 7 sensors
  arraylefsd6test = 0;
   arraylelf1sd6 = 0;
   arraylelf2sd6 = 0 ;
   arraylelf1x10 = 0 ;
   arraylelf1x15 = 0 ;
 arraylbtaut  = 0 ;
 arraylbstiff = 0;
 arraylbbent = 0;
 linearray32hf = 0;
 linearray8hf = 0;
end %gensig = 0
cohtest1e= 0;
%.......................................................
% Array design templates
calphase = 0;

if gensig == 0
if arraylehf == 1;
   arraylehf = 1
   insensors1 = [3:20 22:27 30:36 38:43 45  ];
   d = 4.6875/4;
   D = d.*max(size(insensors1)-1);
   proj1 = [10] ;
   proj2 = [ 80] ;
   angadd1  = 180;    %enter pi/2 for reverse, 0 c/w;
   angadd2 = 180;
   angreverse1 = [6 38];    %put Nos. in for reversed phones
```

1-2

2

08/385442

```
angreverse2 = [6 38];
end;
if cohtest1e== 1;
    insensors1 = [3:7 9:20 22:23 25:27 33:35 58 60 61:64  ];
end  %coht
if array1ehfsd6 == 1  ;
    insensors1 = [3:7 9:20 22:23 25:27 33:35 38:41 43 45  ]; %sensors      1 map
%insensors1 = [3:7 9:20 22:23 25:27 33:35 38 39 61:64  ]; %sensors/        ap
sensorson = [1 1 1 1 1 0 1 1  1 1 1 1 1 1 1 1 ...
             1 1 1 1 0 1 1 1  0 0 0 1 1 1 0 1 ...
             1 1 1 0 1 1    ];
  angreversein = [31];          %reversed phones in processing
     angreverse1 = [ 38];     %reversed phones positions in          ray
   angreversechan = [45 ];           % reversed sensors char
  angreverse2 = angreverse1;
        %...............................

   d = 4.6875/4;
     D = d*(38-1)    ;
   angadd1  = 180;     %enter 180 for reverse, 0=otherwise;
   angadd2 = 180;
 proj1 = [64.8];
   proj2 = [110];
 end;
if array1ehfsd6tst1 == 1  ;
     insensors1 = [3:7 9:20 22:23 25:27 33:35 38:41 43 45  ]; %sensors/channel map
      sensorson = [1 1 1 1 1 0 1 0   0 0 0 0 0 0 0 1    ...
             1 1 1 . 0 1 1 1   0 0 0 1 1 1 0 1 ...
             1 1 1 0 1 1 ]; %            0= bad or missing sensors
   angreversein = [31];          %reversed phones in processing vector
      angreverse1 = [ 38];     %reversed phones positions in virtual array
   angreversechan = [45 ];           % reversed sensors channels in
  angreverse2 = angreverse1;
 %...............................
     d = 4.6875/4;
    . D = d*(38-1)    ;
   angadd1  = 180;     %enter pi/2 for reverse, 0 o/w;
   angadd2 = 180;
 proj1 = [64.8];
   proj2 = [110];
  end;  %sdtest
if array1elf1sd6 == 1;
      array1elf1sd6 = 1
   insensors1 = [2 3 7 11 15   19 23 27  34   39 43 46 47 48  ];      %xxx  Array Lo freq, 15 se
   d = 4.6875
   D = 55;   %d.*max(size(insensors1)-1);
    proj1 = [46.8]
      proj2 = [ 136.8]
 end
if array1elf2sd6 == 1
     insensors1 = [49:59 61:64  ];      % Lo freq, 15 sensors
   sensorson = [1 1 1 1 1  1 1 1 1 1 1  0 1 1 1 1 ];
   d = 4.6875
   D = 65.6; %
    proj1 = [-43.2]
   proj2 = [45 ]
end;

if array1elf1x10 == 1
   array1elf1x10 = 1
   insensors1 = [4 8 12 16 20 25 31 35 40 45  ];      %xxx array Lo freq, 10 sensors
   d = 4.6875
   D = d.*max(size(insensors1)-1);
    proj1 = [10]
   proj2 = [ 80]
end;

if array1elf1x15 == 1
   array1elf1x15 = 1
   insensors1 = [2 3 7 11 15 19 23 27 30 34 39 43 46 47 48 ];      %xxx Lo freq, 10 sensors

   d = 4.6875
    % [2,3,7,11,15,19] @d; [23]@3/4d; [27]?d; [30]@d/4; [34,39,43]@d; [46]@3/4d; [47,48]@d;
  D = 5*d+(3/4*d)+d+d/4+3*d+3/4*d+2*d;
    proj1 = [10]
   proj2 = [ 80]
end;
```

1-3

08/385442

```
if array1btaut == 1;
   array1btaut = 1
   insensors1 = [1:8 ];
   d = 1.1719;
   D = d.*max(size(insensors1)-1);
   proj1 = [-68]
   proj2 = [ 16]
end;

if array1bstiff== 1;
   array1bstiff = 1   %[ref. 1line; sd627=in@f1; sd631=out@f1;-68&16deg; ans=-142.4 deg.;ref2be
   insensors1 = [1:8  ];
   sensorson = [1 1 1 1 1 1 1 1];
   d = 1.1719;
    D = d.*max(size(insensors1)-1);
   proj1 = [-68] ;
   proj2 = [ 16] ;
end;

if array1bbent == 1;
    array1bbent =1
   insensors1 = [1:8  ];
   d = 1.1719
    D = d.*max(size(insensors1)-1);
   proj1 = [0]
   proj2 = [ 80]
end;
end  %gensig=0
%...............................................

insendif = diff(insensors1);
yyy = exist('insendifsd6')
if yyy == 1
   insendif = insendifsd6;
end %insendif
if gensig ==1
   insendif = diff(insensors1);
end  %ingensig
insenmax = max(insendif);
end
end
difsens = diff(insensors1);
sumdif = sum(difsens);
xe = 1:size(insensors1);
xe1 = 0;
mainprogram = 1;
disp('  ');
disp('Array Design size is insensors1size')
insensors1size = size(insensors1)
proj1 = proj1;
proj2 = proj2;
gk = exist('Nin');
N = max(size(insensors1));
if gk == 1
      missingphones = Nin-max(size(insensors1));
    else
      missingphones = N-max(size(insensors1));
end  %gk
insens = exist('sensorson');
    if insens == 0,
  sensorson = ones(size(1:max(size(insensors1))))   ;
     end  %insens
   clear af1
ggk = 0;
for am1 = 2:max(size(sensorson));
   if sensorson(am1) == 1 & sensorson(am1-1) == 0,
        ggk = ggk+1;
      af1(ggk) = am1;
   end
   end
unusedsensors =af1  ;
   clear ag1 xxb
xxb = 0;
ggh = 0;
for am = 1:max(size(sensorson));
   if sensorson(am) == 0,
        xxb(am) = am;
        ggh = ggh+1;
```

1-4
4

08/385442

```
        agl(ggh) = am;
      end
      end
  exag = exist('agl');
  if exag == 1,
      virtualsens = agl;
    else
      virtualsens = 1;
  end  %exag
  d = d;
  D=D;
  insensors2 = insensors1;
  xk = exist('angreverse1');
    xm = exist('angreverse2');
  if xk == 1 | xm == 1
      angreversex = [1 angreverse1];
         else
     angreversex = 1;
     angreversein = 1;
     angreverse1 = 1;
     end %xk
  angreverse1 = angreverse2;
  xt = exist('virtualsens');
    if xt ~= 1
      virtualsens =1;
     disp(' ')
     disp('Error...sensorson or virtaulsens doesnt exist; put in array')
     disp('Error...These are required as part of the array definition')
    disp(' ')
     clear xxxu
    zz = xxxu;
   end %xt
 %end input OperatorMachineInterface (OMI)
 %xxxxxxxxxxxxxxxxxxxxxxxxxxxxxxxxxxxxxxxxxxxxxxxxxxxxxxxxxxxxxxxxx
 %..........................................................
 %xxxxxxxxxxxxxxxxxxxxxxxxxxxxxxxxxxxxxxxxxxxxxxxxxxxxxxxxxxxxxx
 if gensig ==0
 input12 = input('(...Load Input File; sdxxx; e.g. 669 )')
 if input12 ~= []
     rfile2 = sprintf('sd%.0f ',input12 );
     fn1 = rfile2;
     temp2 = ['load ',rfile2 ];
         eval(temp2)
     inputfile1 = rfile2
  end % inp2x1
 disp('  ')
 proj1 = proj1
 input13 = input('(Change Angle1 to__? Return if same. )')
 if input13 ~= []
     proj1 = input13;
 end  %Input13
 end %gensig =1
 %xxxxxxxxxxxxxxxxxxxxxxxxxxxxxxxxxxxxxxxxxxxxxxxxxxxxxxxxxxxxxxxxxxxxxxxxxxxxxxxxxx
 %.......................................................
 %.............................................
 %Test signal generation
 if gensig == 1,
     disp('...Caution..Test signal...Set gensig=0 for data')
    fn1 = 'gensig'
    fn2 = fn1
 N1=max(size(insensors1));                        %Number of array sensors
 N1 = N1+missingphones;
 freqs = [540 540];
                 %frequency of fft samples in input matrix.
 lambda1 = 1500/freqs(1);
 %d  = (1500/freqs(1))/2;              %sensor separation in m
 dna1 = lambda1/2*(1:N1);
 D1 = dna1(N1);
 D11 = round(D1);
 sizedat1 = 130;  % N1 x sizedat = input data matrix size
 for xx11 = 1:sizedat1;    %sig gen.
    noise11 = 1;
    amp11 = 10;
    proj1actual = 4 ;  %degrees
    phi11 = ((2*pi.*d/lambda1).*sin( proj1actual*2*pi/360  ).*[0:N1-1]).';       %array rotation b
    phis11(:,xx11) = phi11 + (xx11-1)*(40*2*pi/360);
                             %precession of samps
 end  %xx11
```

1-5
5

08/385442

```
sig11 = amp11.*exp(j*phis11) + noise11*randn(size(phis11));
for xx11 = 1:sizedat1;  %sig gen.
    noise21 = 1;
   amp21 = 10;
   proj2actual = 70;  %deg.
   phi21 = ((2*pi.*d/lambda1).*sin(  proj2actual*2*pi/360 ).*[0:N1-1]).';        %array rotation
   phis21(:,xx11) = phi21 + (xx11-1)*(40*2*pi/360);
                        %precession of samps
end  %xx11
sig21 = amp21.*exp(j*phis21) + noise21*randn(size(phis21));
clear amatrix bmatrix
amatrix = sig11.';       %data input matrix 1, as generated
bmatrix = sig21.';       %data input matrix 2, as generated
endgensig = 1
end %gensig ==1
%...........................................................
% msd. data input matrix from sdx002 as loaded,
%   or as generated for test.
end
end
end
end
end
% msd. data input matrix from sdx002 as loaded,
%   or as generated for test.
%**********************************************************
%xxxxxxxxxxxxxxxxxxxxxxxxxxxxxxxxxxxxxxxxxxxxxxxxxxxxxxxxxx
% start of input files for compute
if gensig == 0
   fr12 = input('(Freq 1 or 2; Return=1)')
      if fr12 == 1 | fr12 == 2
      indata1 = fr12   % 1:2,
             % 1 to analyse data input matrix 1. 2 for 2
   else
   indata1 = 1
   end %fr12
end %gensig
if gensig == 1
   indata1 = 1;
end  %gensig = 1
indatax1 = num2str(indata1);
if indata1 ==1
  inmatrixd1 = amatrix;
  else
  inmatrixd1 = bmatrix;
end  %indata
%%.......................................................
%xxxxxxxxxxxxxxxxxxxxxxxxxxxxxxxxxxxxxxxxxxxxxxxxxxxxxxxxxxxxxx

angr = exist('angreversechan');
if angr == 0
angreversechan = [ ];
end  %angr
inmatrixd1(:,[angreversechan]) = -inmatrixd1(:,[angreversechan]);
sens1 = size(insensors1);
inmatrix1 = inmatrixd1(:,insensors1);
inmatrixsize1 = size(inmatrix1)
%xxxxxxxxxxxxxxxxxxxxxxxxxxxxxxxxxxxxxxxxxxxxxxxxxxxxxxxxxxxxxx
%......................................................
% Sig No. 1
%..................................................
tic
freq11 =freqs(1);
freq21 = freqs(2);
lambda11  = 1500/freq11;
frequex1 = num2str(freq11);
frequex2 = num2str(freq21);
freqsx1 = [frequex1 '; ' frequex2]
%freqsx1 = num2str(freqs);
lambda21 = 1500/freq21;
if indata1 == 1,
   lambda zz1 = lambda11;
   indatax1 = 1;
   freq1 = freq11;
  else
   lambdazz1 = lambda21;
   indatax1 = 2;
   freq1 = freq21;
```

1-6
6

08/385442

```
end %indatal
indatax1 = num2str(indata1);
lambdax1 = lambdazz1;
freq1 = freq1
%....................................................
%....................................................
offset11 = 128;
samps1 = max(size(amatrix));%440;
samps1 = min([128  samps1]);
sampsx1 = num2str(samps1);
for ww1 =   1;%:3;%  floor(size(inmatrix1)/max(offset1,samps1));
wwx1 = num2str(ww1);
wkmatrix1 = inmatrix1(((ww1-1)*offset11)+1:((ww1-1)*offset11)+samps1,:);
wkmatrixsize1 = size(wkmatrix1) ;
clear data11
nn1=16;
sizeinmatrix1 = size(inmatrix1)
mmn1 = sizeinmatrix1(2);
N1=sizeinmatrix1(2);
D1 =d*(N1-1);
dpost1 = d*[0:N1-1];
data1x1 = wkmatrix1;
for kk1 =1:samps1; %min(mmn1,nn1);
for kk11 = 1:N1;
   data11(kk1,kk11) = data1x1(kk1,kk11) + 0*randn;
end %kk1
end  %kk1
theta11 = 0*(2*pi)/360;
amat1 = data11;
fftdata1 = 1;
fftcohr1 = 1;
cohr1 = 1;
printfft1 = 0;
ww11 = ww1
%****************************************************
%........................................ FFT FFT FFT
%This generates an fft for phone one as a confidence indicator.
if fftdata1 == 1
        %1 for fft display of temporal data on sensors
fftdata1 = 1;
clg
for kk11 = 1;% [1 N]  %use N for last sensor snr ; %min(size(amat))
phonex1 = num2str(kk11);
fftbins1 = 128;
fftbinsx1 = num2str(fftbins1);
xxf1 = 20*log10(abs(fft(amat1(:,kk11),fftbins1)));
plot(xxf1+20*kk11);
titsx1 = ['Time = '  time2 '   FFT'];
[X1,y1] = max(xxf1);
if y1>fftbins1/2,
   noise11 = mean(xxf1(1:20));
else
   noise11 = mean(xxf1((fftbins1/2)-3:(fftbins1/2)+17));
end
snr1(kk11) = X1-noise11;
snrx1 = num2str(snr1(kk11));
snrxx1  = sprintf('%6.1f', snr1);
snryy1 = [snrxx1 ];
snryy11 = [snrxx1 ' dB SNR; Ch 1' ];
filea1 = ['File1=' fn1 '; Freqs1=' freqsx1 '; ' time2 ';  Samples1 ' ];
fileb1 =['Res=1.6/fftbins; fftbins= ' fftbinsx1 '; FFT Samples= ' sampsx1 '; Time Cut = ' wwx1
 if kk11 ==1,
  ht1 = 4*X1*(8/N1)*2;
end %kk11 ==1
tempvar1 = 1.25*N1.^.5*ht1;
axis([0 140 0 .2*tempvar1]);
end  %kk1
text(0,20,snryy11)
titsx1 = ['Time = '  time2 '   FFT'];
xlabel(['File=' fn1 '; Freqs1=' freqsx1 '; ' time2 ';  Samples ' ])
title(['Res=1.6/fftbins; fftbins= ' fftbinsx1 '; FFT Samples= ' sampsx1 '; Time Cut = ' wwx1 ';
ylabel(['FFT Amplitude;  SNR= ' snrx1 ' dB'])
end %sens1 <
grid
pause(1)
%.............................................
%***************************************************fftCohr
%This generates a coherence fft to view....not now used.
```

1-7

7

08/385442

```
clg
if fftcohr1 ==1,
xxend1 = 0;
clg
if xxend1 == 1,
for sens1 = [1:N1];%  1:sensors;
amat1 = amat1(1:samps1,:);
   num21 = amat1(:,1).*exp(j*(2*pi*.5-(0))*(1:samps1)).'.*conj(amat1(:,sens1));
 den21 = abs(amat1(:,1)).*abs(amat1(:,sens1));
   xx1 = 20*log10(abs(fft(num21,samps1)));
if sens1 <1
   plot((0:samps1-1)-samps1/2,xx1-max(xx1)-(sens1*25)+25);
 titsx1 = ['Time = '  time2 '   FFT'];
 zz1 = min([128 samps1/2]);
 axis([-zz1 zz1 -200 0])
  xlabel(['File=' fn1 '; Freqs=' freqsx1 '; ' time2 ';  Samples ' ])
  title(['Res=1/Samples; Samples= ' sampsx1 '; Time Cut = ' wwx1 '; Freq = ' indatax1 ])
 ylabel('Coherence FFT Amplitude (dB)')

[X1,y1] = max(xx1);
hold on
grid
pause(.001)
grid
end  %kk11
titsx1 = ['Time = '  time2 '   FFT'];
 xlabel(['File=' fn1 '; Freqs=' freqsx1 '; ' time2 ';  Samples ' ])
  title(['Res=1/Samples; Samples= ' sampsx1 '; Time Cut = ' wwx1 '; Freq = ' indatax1 ])
ylabel('Coherence FFT Amplitude')
grid
end %sens<4
end
end
%.........................................................
%XxXXXXXXXXXXXXXXXXXXXXXXXXXXXXXXXXXXXXXXXXXXXXXXXXXXXXXXXX
%**********************************************************
%This generates coherence for phase delay measurements and
%  converted into range delays for each sensor and projector
if cohr1 ==1,
cohr1 = 1
xxend1 = 0
if xxend1 == 0,
mm1= min(mmn1,nn1);       %mm samples
mmx1 = num2str(mm1);
sensors1 = N1;   %no. sensors to measure re senso1
clear coh11 coh21 cohr21 cohsen1
clg
%.....................................................
%......................................
for sens1 = [1:N1];  %  1:sensors1;
 for kk11= 1:samps1;
      num1a(kk11) = (amat1(kk11,1).*conj((amat1(kk11,sens1))));
    den1a(kk11) = abs(amat1(kk11,1)).*abs(amat1(kk11,sens1));
  end  %kk11
coh1a = num1a./den1a;
cohala = mean(coh1a);
angcohala = 360/(2*pi)*angle(cohala);
angdel1a = angcohala;
angkk1a(sens1) = angdel1a;        %complex smoothing
cohalxa(sens1) = abs(cohala);
coh1 = cohalxa;        % Normalized coherence for each phone
end
end
end
end

plot(1:N,cohalxa,'-',1:N,cohalxa,'x')
axis([0 1.2*N 0 1.1])
grid
title('Normalized Coherence vs Sensor No.')
ylabel('Normalized Coherence')
indata1x=num2str(indata1);
titsy11 = ['Time = '  time2 '; #1,  Sensor No.'];
file1 = ['File=' fn1 '; Freqs=' freqsx1  '; f=' indata1x '; ' titsy11];
xlabel(file1)
pause on
if gensig ==0
    inputx = input('Pause...Hit Return to continue...')
```

08/385442

```
end%gensig
clg

for sensx1 = [2:N1];  %  1:sensors1;
for kk11= 1:samps1;
   num1(kk11) = (amat1(kk11,sensx1-1).*conj((amat1(kk11,sensx1))));
    den1(kk11) = abs(amat1(kk11,sensx1-1)).*abs(amat1(kk11,sensx1));
end  %kk11
coh1 = num1./den1;
coha1 = mean(coh1);
angcoha1 = 360/(2*pi)*angle(coha1);
angdel1 = angcoha1;
angkk1(sensx1) = angdel1;        %complex smoothing
coha1x(sensx1) = abs(coha1);
coh1x = coha1x;         % Normalized coherence for each phone
end
end
end
end
end
%...............................................
 plot(1:N,angkk1,'-',1:N,angkk1,'o')
hold on
plot(angreversein,angkk1(angreversein),'yo');
 axis([0 1.1*N -200 200])
 ylabel('Phase angle before correction if any (deg)')
 snr1x1=num2str(snr1(1));
indata1x=num2str(in.ata1);
titsy11 = ['Time = '  time2 '; #1,  Sensor No.'];
file1 = ['File=' fn1 '; Freqs=' freqsx1  '; f=' indata1x '; ' titsy11];
xlabel(file1)
ylabel('Phase Angle (Degrees)')
title('Phase Measurements')

grid
pause on
pause(1)
if gensig == 0
   inputx = input('Pause...Hit Return to continue...')
end  %gensig
kk1 = 1

pa2x1b
```

1-9

9

08/385442

```
%pa2x1b.m CPL Measurement End
msmtprogeg = 2;
clg
figure(1)
%XXXXXXXXXXXXXXXXXXXXXXXXXXXXXXXXXXXXXXXXXXXXXXXXXXXXXXXXXXXXXXX
% Virtual Array Templates for missing phones or backward phone wiring
angkk1gen = angkk1;
clear yy1 kk zza zz1 exceeddf1 exceedf1
excda=zeros(size(1:N));
zz = angkk1gen;
exceed1 = zeros(size(1:N));
exceeddf= 0;
for ag = 2:max(size(angkk1gen));
   phasediff = (angkk1gen(ag)-angkk1gen(ag-1));
       if phasediff >180
           excda(ag) = ag;
       end  %ifpha
end  %ag
excd = [excda];
zz1=0;
gg=1;
zza=0;
for kk = 2:max(size(sensorson))
  kk;
       if sensorson(kk) == 1,
          gg = gg+1;
       end  %sens
         %The following is to interpolate between bad sensors
         %It projects the last contiguous good pair until the next good pair
   if sensorson(kk) ==1 & sensorson(kk-1) == 1; %miss sensor + one past
       if excd(gg) == 0          %when modulo has wrapped around
         zza =zz(gg);
           zz1 = zza;
        else
           exceed1(kk) = gg;   % this gives used sensors
            end %phase
        %zz1 = zza
        kf = 1;
    else
       kf =2;
       zza = zz1;
  end %yy1
 zzx1(kk) = zza;    % this is the interpolated phases
%clear zza
end  %kk
end
end
sizezz = size(zzx1)     ;
zzx1a = zzx1
angkk1x = zzx1;
for xxh = 1:max(size(angkk1x))
   angkk1a = sum(angkk1x(1:xxh));
   angkk1b(xxh) = angkk1a;
clear angkk1a
end %xxh
end
end
angkk1 = angkk1b;
plot(angkk1x)
   N = max(size(angkk1));
end %difangref
end %gensig
end
end
%end virtual array templates
%XXXXXXXXXXXXXXXXXXXXXXXXXXXXXXXXXXXXXXXXXXXXXXXXXXXXXXXXXXXXXXX

angslphi1 = (angkk1.');
angslrad1 = angslphi1*2*pi/360;
%angsl1 = unwrap(angslrad1);
angsl1 =(angslrad1);
angsldeg1 = angsl1*360/(2*pi);
angsl = angsl1.';
angdel1 = diff(angkk1).';
angdela1 = [0; angdel1];
angdegs1 = [angsldeg1 angdela1];
end
```

2-1

10

08/385442

```
end
end

tic
rangex1 = (angsl1.*lambdazz1/(2*pi));
range1 = rangex1.';
angdegs1 = angdegs1(1:N).';
rangex1 = range1.';
rangediff11 = (diff(range1)).';
rangediff1 = [0; rangediff11];

rangem1 = [rangex1 rangediff1];
format bank
rangxdmxangxddeg1 = [rangem1 angdegs1]
format short
dd1 = polyfit(1:N,range1,1);
rangesl1 = polyval(dd1,1:N);
mod11 = range1 + lambdazz1- range1;
mod01 = 0*mod11;
mod21 = -mod11;
clg
   plot(1:N,range1,'-',1:N,range1,'o')
   hold on
  plot(virtualsens,range1(virtualsens),'c*',angreversex,range1(angreversex),'y+',angreversex,ra
  hold on
  plot(unusedsensors,range1(unusedsensors),'w+')
hold on
plot(1:N,rangesl1,'-',1:N,mod01,'--')
text(3*(max(size(range1)))/4,(mod11(1)),'Wavelength')
if max(range1) > mod11,
   hold on
   plot(1:N,mod11,'--')
end %range1 >
if min(range1) < -mod11,
   hold on
   plot(1:N,mod21,'--')
end %range1 >
 snr1x1=num2str(snr1(1));
ylabel(['1.6/samps Hz Res; Coherence Delays (meters)'])
title(['SNR= ' snr1x1 ' dB; Samples= ' sampsx1 '; Time Cut = ' wwx1 '; Freq = ' indatax1 ])
xlabel(file1)
grid
zz1= toc;
if gensig == 0
pause on
if gensig == 0
   inputx = input('Pause...Hit Return to continue...')
end %gensig
else
pause(1)
end %gensig==0
%>.............................................................
%XXXXXXXXXXXXXXXXXXXXXXXXXXXXXXXXXXXXXXXXXXXXXXXXXXXXXXXXXXXXX
%  Start  Sig no. 2     Sig. No. 2
%........................................................
%........................................................
N = max(size(insensors1))
if gensig == 0
input12 = input('(...Load Input File; sdxxx; e.g. 669 ;')
if input12 ~= []
    rfile2 = sprintf('sd%.0f ',input12 );
    fn2 = rfile2;
    temp2 = ['load ',rfile2 ];
       eval(temp2)
    inputfile2 = rfile2
   else
    load sdx002
   inputfile2 = ['sdx002']
 end % inp2x1
disp('  ')
proj2 = proj2
input23 = input('(Change Angle1 to__? Return if same... )')
if input23 ~= []
   proj2 = input23;
end  %Input23
end %gensig =1
%xxxxxxxxxxxxxxxxxxxxxxxxxxxxxxxxxxxxxxxxxxxxxxxxxxxxxxxxxxxxxxxxxxxxxxxxxxxxxxx
%.....................................................
```

2-2

11

08/385442

```
%.............................................
%*******************************************************
if gensig == 0
   fr12 = input('(Freq 1 or 2; Return = 1)')
   if fr12 == 1 | fr12 == 2
   indata2 = fr12;    % 1:2,
             % 1 to analyse data input matrix 1. 2 for 2
   else
   indata2 = 1
 end %fr12
end %gensig
if gensig ==1
   indata2 = 2;
end %gensig==1

indatax2 = num2str(indata2);
if indata2 ==1
  inmatrixd2 = amatrix;
  else
  inmatrixd2 = bmatrix;
end  %indata

if max(size(inmatrixd2))< samps1,
  kk2=1
   disp(' ')
    disp(' ')
   disp('Error...File 2 samples less than either 128 or File1 .');
   disp('In the program, samps2=samps1, thus if File1 is <128, its ok.')
   disp('Redo the operation with File2 used first as File1');
  disp(' ')
end  %samps2
if samps1 < 128,
   inmatrixd2 = inmatrixd2(1:samps1,:);
end
%%....................................................
%xxxxxxxxxxxxxxxxxxxxxxxxxxxxxxxxxxxxxxxxxxxxxxxxxxxxxxxxxxxxxxx

%Define the array being analysed by sensor numbers

angr = exist('angreversechan');
if angr == 0
angreversechan = [ ];
end  %angr
inmatrixd2(:,[angreversechan]) = -inmatrixd2(:,[angreversechan]);

sens2 = size(insensors2);
inmatrix2 = inmatrixd2(:,insensors2);
inmatrixsize2= size(inmatrix2)
%xxxxxxxxxxxxxxxxxxxxxxxxxxxxxxxxxxxxxxxxxxxxxxxxxxxxxxxxxxxxxxx
%.....................................................
tic
freq12 =freqs(1);
freq22 = freqs(2);
lambda12  = 1500/freq12;
frequex12 = num2str(freq12);
frequex22 = num2str(freq22);
freqsx2 = [frequex12 '; ' frequex22]
%freqsx2 = num2str(freqs);
lambda22 = 1500/freq22;
if indata2 == 1,
   lambdazz2 = lambda12;
   indatax2 = 1;
   freq2 = freq12;
  else
   lambdazz2 = lambda22;
   indatax2 = 2;
   freq2 = freq22;
end %indata2
indatax2 = num2str(indata2);
lambdax2 = lambdazz2;
%.....................................................
%.....................................................
offset12 = offset11; %128;
samps2 = samps1; %128; %normally 128 on disk; can be 999;
sampsx2 = num2str(samps2);
for ww2 =   1;%:3;%  floor(size(inmatrix1)/max(offset1,samps1));
wwx2 = num2str(ww2);
wkmatrix2 = inmatrix2(((ww2-1)*offset12)+1:((ww2-1)*offset12)+samps2,:);
```

2-3

12

08/385442

```
wkmatrixsize2 = size(wkmatrix2) ;
clear data12
nn2=16;
sizeinmatrix2 = size(inmatrix2)
mmn2 = sizeinmatrix2(2);
N2=sizeinmatrix2(2);
D2 = 1.1719*(N2-1);
dpost2 = 1.1719*[0:N2-1];
data1x2 = wkmatrix2;
for kk2 =1:samps2; %min(mmn2,nn2);
for kk12 = 1:N2;
   data12(kk2,kk12) = data1x2(kk2,kk12) + 0*randn;
end %kk2
end  %kk2
theta12 = 0*(2*pi)/360;
amat2 = data12;
fftdata2 = 1;
fftcohr2 = 1;
cohr2 = 1;
printfft2 = 0;
ww12 = ww2
%************************************************
%XXXXXXXXXXXXXXXXXXXXXXXXXXXXXXXXXXXXXXXXXXXXXXXXXXXX

if fftdata2 == 1
         %1 for fft display of temporal data on sensors
fftdata2 = 1;
clg
for kk12 = 1:1    ; %min(size(amat2))
phonex2 = num2str(kk12);
fftbins2 = 128;
fftbinsx2 = num2str(fftbins2);
xxf2 = 20*log10(abs(fft(amat2(:,kk12),fftbins2)));
plot(xxf2+20*kk12);
titsx2 = ['Time = '  time2 '    FFT'];
[X2,y2] = max(xxf2);
if y2>fftbins2/2,
   noise12 = mean(xxf2(1:20));
else
   noise12 = mean(xxf2((fftbins2/2)-3:(fftbins2/2)+17));
end
snr2(kk12) = X2-noise12;
snrx2 = num2str(snr2(kk12));
snrxx2  = sprintf('%6.1f', snr2);
snryy2 = [snrxx2 ];
snryy12 = [snrxx2 ' dB SNR; Ch 1' ];

text(y2,X2+20*kk12,phonex2)
text(0,20,snryy2)
 if kk12 ==1,
  ht2 = 4*X2*(8/N2)*2;
end %kk12 ==1
tempvar2 = 1.25*N2.^.5*ht2;
axis([0 140 0 .2*tempvar2]);
end  %kk2
text(0,20,snryy12)
titsx1 = ['Time = '  time2 '    FFT'];
xlabel(['File=' fn2 '; Freqs1=' freqsx2 '; ' time2 ';  Samples ' ])
title(['Res=1.6/fftbins; fftbins= ' fftbinsx2 '; FFT Samples= ' sampsx2 '; Time Cut = ' wwx2 ';
ylabel(['FFT Amplitude;  SNR= ' snrx2 ' dB'])

end %sens2 <
grid
pause(1)
%.............................................
%**************************************************fftCohr
clg
if fftcohr2 ==1,
xxend2 = 0;
clg
if xxend2 == 1,
for sens2 = [1:N2];%  1:sensors;
amat2 = amat2(1:samps2,:);
   num22 = amat2(:,1).*exp(j*(2*pi*.5-(0))*(1:samps2)).'.*conj(amat2(:,sens2));
   den22 = abs(amat2(:,1)).*abs(amat2(:,sens2));
   xx2 = 20*log10(abs(fft(num22,samps2)));
if sens2 <1
   plot((0:samps2-1)-samps1/2,xx2-max(xx2)-(sens2*25)+25);
```

2-4

13

08/385442

```
titsx2 = ['Time = '  time2 '   FFT'];
zz2 = min([128 samps2/2]);
axis([-zz2 zz2 -200 0])
 xlabel(['File=' fn2 '; Freqs=' freqsx2 '; ' time2 ';  Samples ' ])
 title(['Res=1/Samples; Samples= ' sampsx2 '; Time Cut = ' wwx2 '; Freq = ' indatax2 ])
ylabel('Coherence FFT Amplitude (dB)')
[X2,y2] = max(xx2);
hold on
grid
pause(.001)
grid
end  %kk12
titsx2 = ['Time = '  time2 '   FFT'];
 xlabel(['File=' fn2 '; Freqs=' freqsx2 '; ' time2 ';  Samples ' ])
  title(['Res=1/Samples; Samples= ' sampsx2 '; Time Cut = ' wwx2 '; Freq = ' indatax2 ])
ylabel('Coherence FFT Amplitude')
grid
end %sens2<4
end
end
end

k=1
%.............................................................
%XxXXXXXXXXXXXXXXXXXXXXXXXXXXXXXXXXXXXXXXXXXXXXXXXXXXXXXXXXXX
%************************************************************
if cohr2 ==1,
cohr2 = 1
xxend2 = 0
if xxend2 == 0,
mm2= min(mmn2,nn2);      %mm samples
mmx2 = num2str(mm2);
sensors2 = N2;   %no. sensors to measure re senso1
clear coh12 coh22 cohr22 consen2
clg
end
end
end
end
%..........................................................
%.....................................................
for sens2 = [1:N2];  %  1:sensors1;
for kk12= 1:samps2;
    num2a(kk12) = (amat2(kk12,1).*conj((amat2(kk12,sens2))));
     den2a(kk12) = abs(amat2(kk12,1)).*abs(amat2(kk12,sens2));
 end  %kk12

coh2a = num2a./den2a;
coha2a = mean(coh2a);
angcoha2a = 360/(2*pi)*angle(coha2a);
angdel2a = angcoha2a;
angkk2a(sens2) = angdel2a;         %complex smoothing
coha2xa(sens2) = abs(coha2a);
coh2 = coha2xa;
end
end
end
end
plot(1:N,coha2xa,'-',1:N,coha2xa,'x')
axis([0 1.2*N 0 1.1])
grid
title('Normalized Coherence vs Sensor No.')
ylabel('Normalized Coherence')
indata2x=num2str(indata2);
titsy21 = ['Time = '  time2 '; #2,  Sensor No.'];
file2 = ['File=' fn2 '; Freqs=' freqsx2  '; f=' indata2x '; ' titsy21];
xlabel(file2)
if gensig == 0
   inputx = input('Pause...Hit Return to continue...')
end  %gensig
%.....................................
clg
clear sens2 kk12
for sens2 = [2:N2];  %  1:sensors1;
 for kk12= 1:samps2;
   num2(kk12) = (amat2(kk12,sens2-1).*conj((amat2(kk12,sens2))));
    den2(kk12) = abs(amat2(kk12,sens2-1)).*abs(amat2(kk12,sens2));
 end  %kk12
```

2-5

14

08/385442

```
coh2 = num2./den2;
coha2 = mean(coh2);
angcoha2 = 360/(2*pi)*angle(coha2);
angdel2 = angcoha2;
angkk2(sens2) = angdel2;          %complex smoothing
coha2x(sens2) = abs(coha2);
coh2x = coha2x;
end
end
end
end

plot(1:N,angkk2,'-',1:N,angkk2,'o')
hold on
plot(angreversein,angkk2(angreversein),'yo');
 axis([0 1.1*N -200 200])
 ylabel('Phase angle before correction if any (deg)')
 snr1x2=num2str(snr2(1));
indata2x=num2str(indata2);
titsyl2 = ['Time = '  time2 '; #2,  Sensor No.'];
file2 = ['File=' fn2 '; Freqs=' freqsx1  '; f=' indata2x '          .2];
xlabel(file2)
ylabel('Phase Angle (Degrees)')
title('Phase Measurements')
grid
pause on
pause(1)
if gensig == 0
   inputx = input('Pause...Hit Return to continue...
end  %gensig
%...................................................
%XXXXXXXXXXXXXXXXXXXXXXXXXXXXXXXXXXXXXXXXXXXXXXXXXXXXXXX
%Virtual Array Templates for second file

angkk2gen = angkk2;
clear yy1 kk zz zza zz1 exceedf2 exceeddf2 zzx2 exceed2
zz = angkk2gen;
gg=1;
zza = 1;
excda=zeros(size(1:N));
exceed2 = zeros(size(1:N));
exceeddf2 = 0;
for ag = 2:max(size(angkk2gen));
   phasediff = (angkk2gen(ag)-angkk2gen(ag-1));
       if phasediff >180
           excda(ag) = ag
       end  %ifpha
end  %ag
excd = [ excda];
for kk = 2:max(size(sensorson))
  kk;
       if sensorson(kk) == 1,
          gg = gg+1;
       end  %sens
%The following is to interpolate between bad sensors
%It projects the last contiguous good pair until the next good pair
   if sensorson(kk) ==1 & sensorson(kk-1) == 1; %miss sensor + one past
       if excd(gg) == 0          %when modulo has wrapped around
         zza =zz(gg);
           zz1 = zza;
        else
           exceed2(kk) = gg;   % this gives used sensors
       end %phase
        %zz1 = zza
        kf = 1;
    else
       kf =2;
       zza = zz1;
  end %yy1
 zzx2(kk) = zza;    % this is the interpolated phases
end  %kk
end
end
sizezzx2 = size(zzx2)    ;
zzx2a = zzx2
angkk2x = zzx2;
for xxh = 1:max(size(angkk2x))
   angkk2a = sum(angkk2x(1:xxh));
```

2-6

15

08/385442

```
    angkk2b(xxh) = angkk2a;
  clear angkk2a
  end %xxh
  end
  end
  angkk2 = angkk2b;
    N = max(size(angkk2));
  end %difangref
  end %gensig
  end
  end
  %end virtual array templates
  %XXXXXXXXXXXXXXXXXXXXXXXXXXXXXXXXXXXXXXXXXXXXXXXXXXXXXXXXXXXXXXXXXX

  angslphi2 = (angkk2.');
  angslrad2 = angslphi2*2*pi/360;
  angsl2 = (angslrad2);
  angsldeg2 = angsl2*360/(2*pi);
  angs2 = angsl2.';
  angdel2 = diff(angkk2).';
  angdela2 = [0; angdel2];
  angdegs2 = [angsldeg2 angdela2];
  tic
  rangex2 = (angsl2.*lambdazz2/(2*pi));
  range2 = rangex2.';
  angdegs2 = angdegs2(1:N).';
  rangex2 = range2.';
  rangediff12 = (diff(range2)).';
  rangediff2 = [0; rangediff12];
  rangem2 = [rangex2 rangediff2];
  format bank
  rangxdmxangxddeg2 = [rangem2 angdegs2]
  format short
  dd2 = polyfit(1:N,range2,1);
  rangesl2 = polyval(dd2,1:N);
  mod12 = range2 + lambdazz2- range2;
  mod02 = 0*mod12;
  mod22 = -mod12;

  clg
    plot(1:N,range2,'-',1:N,range2,'o');
   hold on
    plot(virtualsens,range2(virtualsens),'c*',angreversex,range2(angreversex),'y+',angreversex,ra
    hold on
     plot(unusedsensors,range2(unusedsensors),'w+')
  hold on
  plot(1:N,rangesl2,'-',1:N,mod02,'--')
  text(3*(max(size(range2)))/4,mod12(1),'Wavelength')
  if max(range2) > mod12,
     hold on
     plot(1:N,mod12,'--')
  end %range2 >
  if min(range2) < -mod12,
     hold on
     plot(1:N,mod22,'--')
  end %range2 >
  snrlx2=num2str(snr2(1));
  ylabel(['1.6/samps Hz Res; Coherence Delays (meters)'])
  title(['SNR= ' snrlx2 ' dB; Samples= ' sampsx2 '; Time Cut = ' wwx2 '; Freq = ' indatax2 ])
  xlabel(file2)
  grid
  zz2= toc;
  comptime1 = comptime1
  %=++++++++++++++++++++++++++++++++++++++++++++++++++++++++
  dmalargem = range1;
  dma2argem = range2;
  dmala = range1;
  dma2a = range2;
  N = N1;
  lambdax = lambdazz1;
  sampsx = num2str(samps1);
  lambda2x1 = lambdazz1
  vars = '1';
  titsy ='2';
  file = '3';
  indatax1 = '4'
  indatax = '5';
  temp2 = '6'
```

2-7
16

08/385442

```
  sig2 = [fn2];
      temp2;
 file2x1 =  fn2;
 fn2x1 = fn2 ;
 sig1 = [fn1];
 file1x1 =  fn1;
 fn1x1 = fn1 ;
 lambda1x1 = lambdazz1 ;
 frequency1x1 = freq1 ;
 snr1x = snr1;
 snr1x1 = num2str(snr1x) ;
 sampsx1x1 = sampsx;
 indatax1x1 = indatax ;
 indatax2x1 = indatax1 ;
 frequency2x1 = freq2 ;
 snr2x1 = num2str(snr2);
 frequency1x1x = freq1;
 frequency2x1x = freq2;
 clear kk1 kk s1 keeps callong
 %..........................................................
 if gensig == 0
 pause on
 disp('Pause....Hit key')
 if gensig == 0
    inputx = input('Pause...Hit Return to continue...')
 end  %gensig
 else
 pause(1)
 end %gensig==0
 virtualsens

 pa2x2
```

2-8

17

```
%pa2x2 program

figure(1)
clf

rpostrod = 5;
%...............................................
%This converts non-orthogonal spatial range delays
% into orthogonal x-y plots by iterating outputs assuming
% errors in Projector bearings during measurements.
% These are usually off by +/- 10 to 20 degrees.  A polar plot
% is then made by subprogram referenced to True Bearing.
% Projector 1 bearing is assumed to be given in true
% coordinates and this is the reference for the polar plot.

%...............................................
tim = fix(clock);
tim = fix(clock);  day = tim(3);  ds = num2str(day);mo = tim(2);
mos = num2str(mo);  yr = tim(1);  yrs = num2str(yr);
date = ['d' ds '-' mos '-' yrs];
timehr = tim(4);  xtimehr = num2str(timehr);
timemin = tim(5);  xtimemin = num2str(timemin);
time2 = [date ' ' xtimehr ':' xtimemin];
disp(' ')
disp(' ')
timex =['acov7MJCx5..........................;   ' time2];
disp(timex)
%...............................................
%...............................................
pa = exist('virtualsens');
if pa ~= 1
   angreversex = 1;
      virtualsens =1;
end %pa
virtualsens
pnb = exist('unusedsensors');
if pnb == 0,
   unusedsensors = 1;
end  %pnb
prb = exist('proj1');
if prb == 0,
   proj1 = 0;
end   %proj
%...............................................
cal1 = 1;
calphase = 1;
cal2 = 0;
pause1 = 0;
titsax = ['titsax'];
titsa2 = ['titsa2'];
tits2 = ['CPL Range Delay Msmts '];
calsigs =2;
%...............................................
siguncal1 = zeros(8,8);    %add the following
dm11  = zeros(8);
showcalsigs12 = 2;
siguncal2 = zeros(8);
%...............................................
      rgeoveride = 1;
%...............................................
angcal = 0;
anginner =  -68;
angouter = 16;
angsource1 = anginner;
angsource2 = angouter;
maprog = exist('mainprogram');
angsource1x = num2str(angsource1);
angsource2x = num2str(angsource2);
proj1exist = exist('proj1');
proj2exist = exist('proj2');
if proj1exist,
   if proj1 == 0,
       proj1 = .01;
   end %proj1
   if proj1 == 180;
       proj1 = 180.01;
```

08/385442

```
   end %proj1
 end %proj1ex
 if proj2exist,
    if proj2 == 0 ,
       proj2 = -.01;
    end  %proj2
    if proj2 == 180,
       proj2 = 180.01;
    end   %proj2
 end %proj2ex
%...................................................................
      fixloop = 1;
angtry1 = angsource1*(2*pi)/360; ;          %norm call angle in rads....presumed cal angle
angtry2a =  angsource2*(2*pi)/360;
      angtry2 = angtry2a;
if maprog == 1
     else
        proj1 = -68;
        proj2 = 19;
end  %maprog
 if maprog == 1
   angsource1 = proj1;    %deg
   angsource2 = proj2;
      angtry1 = angsource1*(2*pi)/360;   %rads
   angtry2 = angsource2*(2*pi)/360;      %rads
  end  %mainprogram==1
%..............................................disp(' ')
if maprog == 0,
   load rge1
    fn1 = fn;
   sig1 = [fn1];
pause on
pause(1)
pause off
 vars1x1 =  vars;
titsy1x1 =  titsy;
file1x1 =  file;
fn1x1 = fn ;
lambda1x1 = lambdax ;
frequency1x1 = frequency ;
snr1x1 = snr1x ;
sampsx1x1 = sampsx;
indatax1x1 = indatax ;
dma1a = vars1x1(9,:);
%..........................................................
%sig2 = 2nd signal call from range1x...
    load rge2
  rfileload2 = [' rge2'];
sig2 = [fn];
  vars2x1 =  vars;
titsy2x1 =  titsy;
file2x1 =  file;
fn2x1 = fn ;
lambda2x1 = lambdax ;
frequency2x1 = frequency ;
snr2x1 = snr1x ;
sampsx2x1 = sampsx;
indatax2x1 = indatax ;
dma2a = vars2x1(9,:);
dma1a = dma1argem;
dma2a = dma2argem;
testfile = input11;
if  testfile ==202 ; % | testfile == 201;
      angsource1 = 4;
      angsource2 = 90;
   else
      angsource1 = -68;
      angsource2 = 16;
end  %testfile
end %maprog
maprog = maprog;
N = max(size(dma1a));
dxx = exist('d');
if dxx ==1;
    da = d*[0:N-1];
      D=D
    else
      d = 1.1719;
```

3-2

19

```
        da = d*[0:N-1];
        D= da(N)
    end  %dxx)
%............................................
%......
%anle 2 compute mod 8 Oct 94
insensors1ex = exist('insensors1');
if insensors1ex ==1,
      nreal = max(size(insensors1));
    else
      nreal = max(size(dmalargem));
end %insensors
degrad = 360/(2*pi);
%............................................
abb1 = 0,
if abb1 == 1
proj1 = -68
proj2 = 19
angsource1 = proj1
angsource2 = proj2
angtry1 = proj1/degrad
angtry2 = proj2/degrad
end %abb1
proj1x2 = [proj1 proj2];
delthetcw = sign(diff(proj1x2));  %-=backwards if front
abc1 = 0,
if abc1 == 1,
   arrax = exist('arrayaxis')
      if arrax == 0,
         inputx = input('(Array Axis (Deg. True); eg 270; Return=135..)')
            if inputx == [];
              arrayaxis = 135;
            else
              arrayaxis = inputx;
            end %inpex
end %arrayx
  if arrayaxis < 0,
        arrayaxis = 360 + arrayaxis ;
      end %arrax<0
carrayaxis = rem((arrayaxis + 180),360);
norm = rem((carrayaxis + 90),360);
if abs(proj1 - norm) < 90;
    norma = 1;       %front side of array (cw)
  else
    norma = 0;       % backside of array (Proj1 > 180 deg)
end %abs
if delthetcw == -1 & norma == 1 ,  % +1 =proj2 cw from proj1 (from origin)on front side (0 to
    kkthet = 2;        %proj2 to proj1 CCW or backwards
  else
    kkthet = 1;    %normal
end %delth
end ;%abc1
kkthet = 1
%xxxxxxxxxxxxxxxxxxxxxxxxxxxxxxxxxxxxxxxxxxxxxxxx
figure(1)
clg
lambdaact1 = lambda1x1;
lambdaact2 = lambda2x1;
errd = angtry1+0; %  exp(-12);
er3d = angtry2 +0;  %exp(-12);
angtry1x = num2str(angtry1);
angtry2x = num2str(angtry2);
j = (-1).^.5;
keeps1 = 0;
keeps2=0;
 k1max = 1;
%***********************************************
%>>>>>>>>>>>>>>>>>>>>>>>>>>>>>>>>>>>>>>>>>>>>>>>>
%frequencyx = num2str(frequency);
eps2 = 0;
eps2x = num2str(eps2);
eps2cal = 0;
ang1a = errd + eps;
    ang2a = er3d  + eps2 - eps2cal;
 if (ang2a) > 0,
   signang2 = 1;
   else
   signang2 = -1;
```

```
end %ang2a>0
eps2x = num2str(eps2);
kaa1 = 2;
 ka = kaa1;
if kaa1 == 1
    k1max = 2;
  else
    k1max = 5;
end %kaa1=1
iters = exist('iterations')
if iters ==1
    %k1max =    9 ;    %tells how many iterations to make
        k1max = iterations;
    else
      k1max = 9;
end %iterations
%...........................##############################
if kkthet == 2 ,
      kall = -1
    else
      kall = 1;     %This is normally =+1;Use -1 or s1=-s1 at end if doesnt converge.
end %kall
 signs1 = 1;  %normally +1 vs -1
%Normal:kall=signs1=+1.If no converg:exploding=signs1=kall=-1;pul'ng in kall=+1
%...........................##############################
for ka = 1:k1max ;    %iterations < 6
if ka==1
 ka1 = 0;
end %ka =1
if kaa1 == 1
   sens = .1;
else
   sens = 1;
end %kaa1
if ka == 2
 ka1 = keeps1.*sens;
end
if ka==3,
   ka1 = (keeps1 + keeps2).*sens;
end
if ka==4,
  ka1 = keeps1 + keeps2 + keeps3;
end
if ka==5,
  ka1 = keeps1 + keeps2 + keeps3 + keeps4;
end
if ka==6,
  ka1 = keeps1 + keeps2 + keeps3 - keeps4 - keeps5;
end
if kaa1<2
eps = eps
if ka < 3,
   eeps = eps-eps - ka1;
    kall = 1;
else
   %eeps = eps -kall*ka1;
 end %ka<3
end %kaa1<1
if kaa1 >1
   eeps = eps-eps-kall*ka1;
      deler(ka) = -kall*ka1;
 end %kaa1
ang1 = ang1a - signang2*eeps;
   ang2 = ang2a ;%+ eeps;
if ka == 5
     ka=ka;
end %ka=5
%3#######################################
ka1v = -ka1;
ka1x = num2str(ka1v);
epsex = ['epsest= ' ka1x ];
epsx = num2str(eps);
xa = d-d;
%********************************************************************
%PPPPPPPPPPPPPPPPPPPPPPPPPPPPPPPPPPPPPPPPPPPPPPPPPPPPPPPPPPPPPPPPPP
%jjjjjjjjjjjjjjjjjjjjjjjjjjjjjjjjjjjjjjjjjjjjjjjjjjjjjjjjjjjjjjjjj
```

08/385442

```
clear dm dma1
ccl1 = siguncal1;
if rgeoveride  == 1,
if ka == 1,
    dma1a = dma1argem
end %ka
end  %rge
lambdaact1 = 1.06;
if ka == 1
plot(1:N, (dma1a),'-',1:N, (dma1a),'o');
axis([-2  1.2*N -1.2*N 1.2*N])
hold on
  plot(virtualsens,dma1a(virtualsens),'c*',angreversex,dma1a(angreversex),'y+',angreversex,dma
hold on
  plot(unusedsensors,dma1a(unusedsensors),'w+');
text(N,dma2a(N),'#2')
text(N,dma1a(N),'#1')
ylabel('y posit (m), Calsig=1vsD');
 titsax = [titsa2  ' eps1= ' epsx ' eps2= ' eps2x];
title(tits2);
xlabel(titsax);
grid
disp('Pause....Hit key to continue')
if pause1 ==1,
pause
else
pause(1)
end %pause1=1
hold on
end  %ka=1
%.................................................................
ccl2 = siguncal2;
if rgeoveride == 1,
if ka == 1,
  dma2a = dma2argem
end  %ka
end  %rge
%...................................
if ka==1,
   disp('If want to specify no. of iterations, enter in command window')
   disp('iterations = 1, for instance, at end and then rerun this program.....')
end %ka
%..................................
if ka == 1
hold on
plot(1:N, (dma2a),'-',1:N, (dma2a),'o');
 hold on
  plot(virtualsens,dma2a(virtualsens),'c*',angreversex,dma2a(angreversex),'y+',angreversex,dma2
hold on
  plot(unusedsensors,dma2a(unusedsensors),'w+');
hold on
text(N,dma2a(N),'#2')
grid
axis([-2  1.2*N -1.2*N 1.2*N])
ylabel('y posit (m), Calsig=2vsD');
titsab = ('cda');
title('Range delays for Source #1 and #2 vs Sensors in m (dma1a & dma2a)');

rgemexist = exist('input11');
if rgemexist == 1 & rgeoveride == 1,
    rfilem
    xlabel(['Files= ' rfilem ])
 elseif rgemexist ~=1 & rgeoveride == 1
    xlabel(['files from rgnb'])
else
   xlabel(['Files=' fn1x1x '; ' fn2x1x '; ' titsq '; In= ' angsource1x '; ' angsource2x ' deg']
end %rgem
xu = exist('fn2x1x');
if xu == 1
 %  xlabel(['Files=' fn1x1x '; ' fn2x1x '; ' titsq '; In= ' angsource1x '; ' angsource2x ' deg'
end  %xu
zx = exist('indata1x');
  if zx == 1
     titsy91 = ['Time = '  time2 ];
     file1 = ['File=' fn1 '; ' fn2 '; Freqs=' freqsx1  '; ' freqsx2 '; f=' indata1x '; ' indata
     xlabel(file1)
  end %zx
```

3-5 22

08/385442

```
disp('Pause....Hit key');
if pause1 == 1,
    pause
else
pause(1)
end %pause1 =1
grid
end  %ka=1
if ka==1
   pause on
%   pause (2)
   pause off
input13 = input('(Inspect delays or print hold...return to proceed)')
   clg
  else
hold on
end %k1
%...................................
del = 0;
dma1aa = (dma1a);
dma2aa = (dma2a);
if ang1 == ang2,
   ang2 = ang1+.0001;
end  %ang
sintemp = sin(ang2);
costemp = cos(ang1);
tantemp = tan(ang2);
if  abs(sintemp) < .001,
     sintemp = .001;
end  %abs
if   abs(costemp) < .001,
   costemp = .001;
end  %abs(cos)
if  abs(tantemp) < .001;
     tantemp = .001;
end
xxnum = -(dma2aa./sintemp - (dma1aa./(costemp).*tantemp.^(-1)));
xxden = 1 - tan(ang1).*tantemp.^(-1);
xxx1 = xxnum./xxden;
yyy = -dma1aa./costemp - xxx1.*tan(ang1);
calxy = xxx1 - j.*yyy +da(1) ;
%ssssssssssssssssssssssssssssssssssssssssssssssssssssssssssssssss
 rposcal = calxy;
if ka == 1
   rposx = calxy;
end   %ka
errcal = errd;
errcalx = num2str(errcal);
angcalx = 'x';%num2str(angcal);
[Y,u ]= max(abs(da-rposcal));
maxex = num2str(Y);
maxe1x = num2str(u);
stde2 = std(abs(da-rposcal));
stde2x = num2str(stde2);
stde2pos(ka) = stde2;
rerx2 = ['Cal=' errcalx ' Sest= ' maxex ' m, ' maxe1x ', ' stde2x ' m,__'];
long2 = sum(abs(diff(rposcal)));
long2x = num2str(long2);
tits3 = ['CPL Msmts Iterations; x = Array shape est'];
plot(real(rposcal ),imag(rposcal),'-',real(rposcal),imag(rposcal),'c')
grid
if ka == k1max,
   hold on
   plot(real(rposcal),imag(rposcal),'*');
   end
axis([-1.2*N  1.2*N -1.2*N 1.2*N])
%###########3#######################################   MAIN PLOT
pause(.00001)
ddif = sum(abs(diff(rposcal)));
ddnorm = ddif./ddif(1);
zz = max(ddnorm);
if zz > 1
ddifmax = max(ddnorm);
else
ddifmax = min(ddnorm);
end % if max>1
%ddifmaxx = num2str(ddifmax);
ddifmaxx = num2str(long2/D);
```

3-6

23

08/385442

```
ddifmax1(ka) = ddifmax;
kax = num2str(ka);
tits22 = [titsa2 ' '  epsex ' ka= ' kax ' De= ' long2x ' d/dest= ' ddifmaxx ];
tits24 = [rerx2  tits2 ];
errdx = num2str(errd);
er3dx = num2str(er3d);
keeps = [-3.24 -.8 -.75 -.7 -.6 -.5 -.37 -.25 -.18 -.1 -.04 0 .01 .04 .1 .2 .3 .6 .9 3.24];
callong = [ 10  7 5.8 4.2 2.78 2.08 1.58 1.31 1.2 1.09 1.03 1 .99 .967 .92 .86 .823 .749 .741
longx = long2/D;
for kk = 1:max(size(callong));
zz = longx - callong(kk);
if zz < 0
    kk1 = kk;
  kk = max(size(callong));
end %zz
end %kk
%xxxxxxxxxxxxxxxxxxxxxxxxxxxxxxxxxxxxxxxxxxxxxxxxx#######################
sl = (keeps(kk1)-keeps(kk1+1))/(callong(kk1) - callong(kk1+1));
sl= signsl*sl;
signslx = num2str(signsl);
kallx = num2str(kall);
%xxxxxxxxxxxxxxxxxxxxxxxxxxxxxxxxxxxxxxxxxxxxxxxxxxxxxxxxx##@################
if ka == 1
   keeps1 = keeps(kk1) + sl.* (longx-callong(kk1));
end %ka=1
if ka == 2
   keeps2 = keeps(kk1) + sl.* (longx-callong(kk1));
end %ka=2
if ka == 3
   keeps3 = keeps(kk1) + sl.* (longx-callong(kk1));
end %ka=3
if ka == 4
   keeps4 = keeps(kk1) + sl.* (longx-callong(kk1));
end %ka=4
if ka == 5
   keeps5 = keeps(kk1) + sl.* (longx-callong(kk1));
end %ka=5
if ka == 6
   keeps6 = keeps(kk1) + sl.* (longx-callong(kk1));
end %ka=6
long2a(ka) = long2;
stde2a(ka) = stde2;
rposcala1 = calxy;
xx1 = [abs(rposcala1(2)-rposcala1(1))  abs(rposcala1(3)-rposcala1(2)) abs(rposcala1(4)-rposcala
maxminxx1 = max(abs(xx1))/min(abs(xx1));
sumxx1 = sum(xx1);
stdxx1 = std(xx1);
kasummaxminstd = [ ka kall sumxx1 maxminxx1 stdxx1];
if kaa1<2
if ka ==2;
  cv = abs(long2a(1)-D)-abs(long2a(2)-D)
if  cv >=0
  kall = +1;
else
  kall = -1;
end %abs
end % ka2
end %ka
end %kaa1
end %kaa1 <2
pause(.0001)
hold
ylabel('rpos = Est. Sensors Position  (x=Horiz; y=Vert (m))');
title([tits2 'SNRs= ' snr1x1 '; ' snr2x1 ' dB; d/dest= ' ddifmaxx '; Samples= ' sampsx ]);
rgemexist = exist('input11');
if rgemexist == 1 & rgeoveride == 1,
    rfilem
    zzcc = ['Files= ' rfilem ];
    xlabel(['Files= ' rfilem ])
 elseif rgemexist ~=1 & rgeoveride == 1
    xlabel(['files from rgnb'])
    zzcc = ['files from rgnb'];
else
   xlabel(['Files=' fn1x1x '; ' fn2x1x '; ' titsq '; In= ' angsource1x '; ' angsource2x ' deg'])
end %rgem
pause(.001)
hold on
%*****************************************************************************
```

3-7
24

08/385442

```
%++++++++++++++++++++++++++++++++++++++++++++++++++++++++++++++++++++++++
   rpos = calxy;
cal=0;
pa = da;
cal=0;   %to make file for disk
if cal == 1,
for p1 = 1:max(size(pa));
rtgt = 1000000;          %m
thetatgtd = [ pdeg(p1) ];
thetatgtr = thetatgtd/(360/(2*pi));
ptgt = rtgt*(-sin(thetatgtr)+j*cos(thetatgtr));      %m
   rds(:,p1) = abs(-rpos+ptgt).';                                %m
end   %p1
rds1 = rds;
angcal = errd;
end
%...............................................
rposfirst = rposx./(long2/D);
rposlast = rpos./(long2/D); % this corrects mag for false convervence
disp(' ')
disp('......1st and nth iteration ends/bi as follows:.....')
disp(' ')
rposfirstend = abs(rposfirst(max(size(rposfirst))));
rposlastend = abs(rposlast(max(size(rposlast))));
rpos1stx9th = [    rposfirstend rposlastend]
itsx = num2str(ka);
dest1x9y = sprintf(' %.02f;', rposfirstend, rposlastend);
dxitsy = sprintf(' %.02f;', D);
dest1x9x = ['Dest 1x9 = ' dest1x9y];
dxitsx = ['D= ' dxitsy ' Its = ' itsx];
xlabel([zzcc '; ' dest1x9x ' ' dxitsx ]);
input10 = input('(Use 1st It. or nth? 1st=1; Return=nth)')
     if  input10 >0,
           rpos = rposfirst;
           its1 = 1;
        else
           rpos = rposlast;
           its = ka;
     end  %input10>0

  pa2x3
end
end
end
end
```

3-8
25

08/385442

```
%pa2x3.m program

%  #4 Polar mapping program, sub-program to #3.  This has
%  input of array shape measurements in x-y.  Program becomes
%  oriented to North by source 1 being referenced to true
%  North.
%.................................................
disp(' ')
disp('Program sd4fz2b')
figure(1)
clg
clf
pause(.001)
%.................................................
%.................................................
rposaxis = rpos*(exp(j*2*pi*90/360));
magarest = abs(rpos);
angldisp = (angle(rpos(N) - rpos(1)))*360/(2*pi);
dat1 = (dma1a);
dat2 = (dma2a);
ang1m = asin(dat1(N)/D)*360/(2*pi);
ang2m = asin(dat2(N)/D)*360/(2*pi);
ang1ta = angsource1 + (ang1m + 90);
ang1tb = angsource1 - (ang1m + 90);
ang2ta = angsource2 + (ang2m + 90);
ang2tb = angsource2 - (ang2m + 90);
if ang1ta >= 0,
   ang1a = ang1ta;
  else
   ang1a = ang1ta + 360;
end
if ang1tb >= 0,
   ang1b = ang1tb;
  else
   ang1b = ang1tb + 360;
end %ang
if ang2ta >= 0,
   ang2a = ang2ta;
  else
   ang2a = ang2ta + 360;
end %ang
if ang2tb >= 0,
    ang2b = ang2tb;
  else
    ang2b = ang2tb + 360;
end %ang
angms = [ ang1a ang1b ang2a ang2b]
ang1a = rem(ang1a,360);
ang1b = rem(ang1b,360);
ang2a = rem(ang2a,360);
ang2b = rem(ang2b,360);
[x10,y10] = min(abs([ ang1a-ang2a  ang1a-ang2b  ang1b-ang2a  ang1b-ang2b]));
bsangcont = 1;   %source nearest broadside controls = 1
if  y10 ==1,
    angwant1 = ang1a;
    angwant2 = ang2a;
  elseif y10 ==2
    angwant1 = ang1a;
    angwant2 =ang2b;
  elseif y10 ==3
    angwant1 = ang1b;
    angwant2 = ang2a;
  elseif y10 == 4;
    angwant1 = ang1b;
    angwant2 = ang2b;
end  %y10
angsm = [ang1a ang1b ang2a ang2b]
   if abs(dat1(N)) < abs(dat2(N)),
      angshort = ang1m;
      datshort = 1;
     else
      angshort = ang2m;
      datshort = 2;
   end   %dat1
if  bsangcont == 1 & datshort ==1
        angwant = angwant1;
        angconj = angwant2;
```

4-1

26

08/385442

```
            cont = 1;
      elseif bsangcont == 1 & datshort == 2
            angwant = angwant2;
            angconj = angwant1;
            cont = 2;
      elseif bsangcont == 0,
            angwant =angwant1;
            angconj = angwant2;
            cont = 3
 end   %bsang &
 anglcdif = [cont angwant angconj angconj-angwant]
 diffs =  (diff(rpos))/1.17;
 diffs1 = [0 diffs];
 angdiffs1 = angle(diffs1)*360/(2*pi);
 angdiffs1rad = angle(diffs1);
 angest = angle(rpos(N));
 angrot = angwant - angest*360/(2*pi);
 rpost = exp(j*2*pi*((angrot)/360))*rpos;
 angestrue = angle(rpost(N))*360/(2*pi)
 disp('..................................................')
 rin1 = 1000*(exp(j*angsource1*2*pi/360));
 rin1a = abs(rin1-rpost)-1000;
 rdat1= abs(dat1);
 err1 = rdat1-rin1a;
 err1maxmeanstd(fixloop,:) = [max(abs(err1)) mean(err1)  std(err1)];
 disp(' ')
 rin2 = 1000*(exp(j*angsource2*2*pi/360));
 rin2a = abs(rin2-rp st)-1000;
 rdat2= abs(dat2);
 err2 = rdat2-rin2a;
 err2maxmeanstd(fixloop,:) = [max(abs(err2)) mean(err2) std(err2)];
 spacx = [ [] zeros(size(1:N-6)) [] ];
  err1x2maxmeanstd = [err1maxmeanstd   spacx err2maxmeanstd ];
     zz =['rin1a; rdat1; zeros(size(1:N)); rin2a; rdat2; err1x2maxmeanstd']
  zz =[rin1a; rdat1; zeros(size(1:N)); rin2a; rdat2; err1x2maxmeanstd]
 disp('..................................................')
 clg
 angpol = 2*pi*(1:100)/100;
 magpol = 1.2*D+zeros(size(1:100));
 polar1(angpol,magpol);              %makes polar axis
 xxaxis = axis;
 magpolx = xxaxis(2);
 magpolxx =magpolx +zeros(size(1:100));
 polar1(angpol, magpolxx);
 hold on
 polar1(angle(rpost),abs(rpost),'-')
 hold on
 polar1(angle(rpost),abs(rpost),'ro')
  hold on
 absrpost = abs(rpost);
   polar1(angle(rpost(virtualsens)),absrpost(virtualsens),'c*')
  hold on
   polar1(angle(rpost(unusedsensors)),absrpost(unusedsensors),'w+');

  hold on
   polar1(angle(rpost(angreversex)),absrpost(angreversex),'y+')
   hold on
   polar1(angle(rpost(angreversex)),absrpost(angreversex),'yo')
 angrpost = angle(rpost(max(size(rpost))))*360/(2*pi);
 hold on
  anglcdifx =sprintf('%.0f ',anglcdif )
 if angestrue < 0,
    angestrue1 = angestrue + 360;
 else
    angestrue1 = angestrue;
 end
 hold on
 pause(4)
 hold off
 yyaxis = axis
 text(-2.7*(yyaxis(2))/10,(yyaxis(2))+1,'North')
 text(10.5*(yyaxis(2))/10, .9*(yyaxis(2))/10,'East')
 text(0,1,'#1');
 ang1 ;
 angest;
 angsource1x = num2str(angsource1);
 angsource2x = num2str(angsource2);
 angtry1x = num2str(angtry1*360/(2*pi));
```

4-2

27

08/385442

```
angtry2x = num2str(angtry2*360/(2*pi));
angcalx = num2str(angcal);
angestx = num2str(angrpost);
indatax1x1x = num2str(indatax1x1);
file1x1x = num2str(file1x1);
fn1x1x =   num2str(fn1x1);
lambda1x1x = num2str(lambda1x1);
frequency1x1x = num2str(frequency1x1);
snr1x1x = num2str(snr1x1);
indatax1x1x = num2str(indatax1x1);
file2x1x = num2str(file2x1);
fn2x1x =   num2str(fn2x1);
lambda2x1x = num2str(lambda2x1);
frequency2x1x = num2str(frequency2x1);
snr2x1x = num2str(snr2x1);
indatax2x1x = num2str(indatax2x1);
if exist('posit1')
  else
    posit1 =[];%    ['No ID Given'];
end  %exists
titsq  = [' '  time2 '; Array axis = '   angestx  ' deg T'];
proj1x = num2str(proj1);
ang2est = rem(angsource1 +(ang2-ang1)*degrad, 360);
ang2estx = num2str(ang2est );
angestsx = [num2str(angsource1) ' ' ang2estx];
diffdiffabsrpost = [ 0 0 diff(abs(diff(abs(rpost)))) ];
maxdelrx = num2str(max(abs((diffdiffabsrpost))));
  tempaxis = axis
    text(1.25*tempaxis(1),1.1*tempaxis(3),['Proj1x2 Ests. True = ' angestsx ' deg;  ' posit1 ';
title([ 'SNRs= ' snr1x1x '; ' snr2x1x ' dB;  Freqs = '  frequency1x1x '; ' frequency2x1x ' Hz;
rgemexist = exist('input11')%
if rgemexist == 1,
    rfilem;
    tempaxis = axis
    text(1.25*tempaxis(1),1.2*tempaxis(3),['Files= ' rfilem '; ' titsq ])
     else
    tempaxis = axis
    text(1.25*tempaxis(1),1.2*tempaxis(3),['Files=' fn1x1x '; ' fn2x1x '; ' titsq ])
end %rgem
end
end
end
end
dma1a= dma1a
dma2a= dma2a
disp( ' ')
posit1 = posit1
fn1fn2 = [fn1x1x ' ' fn2x1x]
disp('Estd rel. ranges = rpostabs and diffs in rpost = diffabsrpost....in m ')
rpostabs =[ abs(rpost) ];
diffabsrpost = [0 diff(abs(rpost)) ];
rpostxdiffxdiffdiff = [rpostabs; diffabsrpost; diffdiffabsrpost]
maxrerrsig1x2 = [ max(abs(err1)) max(abs(err2)) ];
disp(' ')
titlexx  = ([ 'SNRs= ' snr1x1x '; ' snr2x1x ' dB;  Freqs = '  frequency1x1x '; ' frequency2x1x '
 ylabelxx = ([posit1 '; refs=' angsource1x '; '  angsource2x  ' deg T; o=rod'])
if rgemexist == 1,
    xlabelxx = (['Files= ' rfilem '; ' titsq '; In= ' angsource1x '; ' angsource2x ' deg'])
      else
   xlabelxx =(['Files=' fn1x1x '; ' fn2x1x '; ' titsq '; In= ' angsource1x '; ' angsource2x ' de
end %rgem
maxrerrsig1x2x = sprintf(' %.2fm',  maxrerrsig1x2 );
disp(' ')
disp('The max range error msd vs bckwd est for...' )
disp([  '....sig1 & sig2; maxrerrsig1x2 = [ ' maxrerrsig1x2x ' ] '])
sigestrtheta = [abs(rpost); angle(rpost)*360/(2*pi)]
rtheta = sigestrtheta
disp('m and deg in true brg vs array axis; axis = vector fm sensor 1 to 8 true brg');
disp('Complex values sigestrtheta in brg true = rpost: type rpost in cmd window.')
disp(' ')
disp('Resolve conjugate ambiguity by adding 180 deg to sensor 2 try angle in deg?')
end
end
end
disp('  ')
disp('Disk to beamformer follows as tonyc1.m and tonyc2.m')
disp('%xxxxxxxxxxxxxxxxxxxxxxxxxxxxxxxxxxxxxxxxxxxxxxxxxxxxxx')
%1111111111111111111111111111111111111111111
```

Y-3

28

08/385442

```
absrpost = abs(rpost).';
anglerpost = (angle(rpost)*360/(2*pi)).';
vertangle = 90*ones(size(1:N)).';
posity = [absrpost   vertangle anglerpost ]
if maprog == 1
     angfreqy = [errd er3d freq1 freq2]
    else
     angfreqy = [0 0 0]
end %maprog
lambx2xDDest = [lambdaact1 lambdaact2  ddifmax]
tim1 = tim
files = [ fn1x1 ' ' fn2x1]
program1 = 'a6f1e';
program2 = '2';
save tonyc1.txt posity    -ascii
save tonyc2.txt angfreqy lambx2xDDest tim1  -ascii
fid=fopen('tonyc3.txt','wt');
tonystring1=['This program is ' program1]
tonystring2='This is some more stuff';
fprintf(fid,'%s\n',tonystring1);
fprintf(fid,'%s\n',tonystring2);
fclose(fid);
save tonyc4 angfreqy lambx2xDDest tim1 program1
anf = exist('angfreqy(4)')
if anf == 1
   anglx2estxintrue = [proj1 anglcdif(3) 360/(2*pi)*angfreqy(1)  360/(2*pi)*angfreqy(2) angfreq
  else
     anglx2estxintrue = [proj1 anglcdif(3)  ]
end %anf
pause
  destr = [posity(max(size(posity)),1) ]
 destrx = sprintf('%.2f; ',destr )
  Dx = num2str(D);
if N<20
    text(-2*(N+2)/1.6,-(magpolx+1*(N+2)/10),dxitsx)
    text(2*(N+2)/8,-(magpolx+1*(N+2)/10),dest1x9x)
else
   text(-2*(N+2)/1.05,-(magpolx+1*(N+2)/10),dxitsx)
    text(2*(N+2)/5,-(magpolx+1*(N+2)/10),dest1x9x)
end %if N<20
disp('%222222222222222222222222222222222222222')
disp('  ')
%******************************************************
redo = 1;
if redo == 0
plot(1:N, (dma1a),'-',1:N, (dma1a),'*');
text(N,dma1a(N),'#1')
ylabel('y posit (m), Calsig=1vsD');
 titsax = [titsa2  ' eps1= ' epsx ' eps2= ' eps2x];
title(tits2);
xlabel(titsax);
grid
axis([-2  N+2 -(1.1*D+2) 1.1*D+2])
hold on
plot(1:N, (dma2a),'-',1:N, (dma2a),'*');
text(N,dma2a(N),'#2')
grid
ylabel(['Range delays (m);  Sources = ' posit1 ]);
titsab = ('cda');
title('Range delays for Source #1 and #2 vs Sensors in m (dma1a & dma2a)');
if rgemexist == 1,
    xlabel(['Files= ' rfilem '; ' titsq '; In= ' angsource1x '; ' angsource2x ' deg'])
      else
   xlabel(['Files=' fn1x1x '; ' fn2x1x '; ' titsq '; In= ' angsource1x '; ' angsource2x ' deg'])
end %rgem
grid
end %redo
end
end
end
end
mainp = exist('mainprogram')
if mainp == 0,
    insensors1 = 1:max(size(dma1a));
end %mainp
input12 = input('(...Save Location?..bfxxx; e.g. 38; Return=no )')
if input12 ~= []
    bffile = sprintf('bf%.0f ',input12 );
```

4-4

29

08/385442

```
     bffilex = [' N d  rpost  fn1x1x  fn2x1x insensors1'];
 templ = ['save ',bffile,bffilex];
       eval(templ)
    end % inp2x1
end %input
end  %N==38
end
end
end
end
end
end
end
end
```

4-5
30

08/385442

```
%pa2xfm.m Program

figure(1)
clg

%    FM Chirp Range Delay Measurements for PLS FMPL.
%  This shows that fm chirps yeild relative ranges between
%  phones or absolute ranges if the replica chirp is timed
%  absolutely by either an rf transmission, or a stable
%  oscillator clock sufficient for less than a msec error (1
%  msec gives about 1.5 m underwater).  This assumes a rough
%  timing or the replica overlaps the received fm pulse.  The
%  actual underwater received fm signal is saved here in file
%  as fm1937 and the overlapped replica is saved as chirpr.
%  With this program, load fm1937 (data) and load chirpr
%  (replica), then start this program.  The output is the
%  correlation functions for the 8 phones in this case in
%  msec. on the first graphic.  Then, the range delays in
%  meters are given in the second graphic.  The range delay
%  vector is output in the command window.  Cut-and-paste
%  the range delay vector for two sources into #5 files.
%  Operate with these range delays for FMPL just as in CPL
%  in that this file is entered into program for array phone
%  x-y iteration location maps.  Wideband noise also works for
%  input range delay measurements.
%       This measures of time delays on channels, then plots
%  the range delays associated with each.  Two such computes
%  and vectors are entered into x-y iteration mapping program.

figure(1)
clg
%==========================================================================
tim = fix(clock);
tim = fix(clock);  day = tim(3);  ds = num2str(day);mo = tim(2);
mos = num2str(mo);  yr = tim(1);  yrs = num2str(yr);
date = ['d' ds '-' mos '-' yrs];
timehr = tim(4);  xtimehr = num2str(timehr);
timemin = tim(5);  xtimemin = num2str(timemin);
time2 = [date ' ' xtimehr ':' xtimemin];
disp('')
disp('')
timex =['acov7MJCx5...........................;   ' time2];
disp(timex)
%.......................................................
clear zzdel yy1 zz1

%inp2x1 = input('(Enter to load sig file ; eg fm1925..type 1925)')
inp2x1 = 1937
if inp2x1 ~= []
    rfile2 = sprintf('fm%.0f ',inp2x1 );
end
inx = inp2x1;
zsamps = 59;    %offset in ref lengths....put to 0 normally

for xx1a = 1%1:100
for xx5 = 1:7;
xx5 = xx5
xx4 = 1;
aa = fm1937(xx4,:);             %59x20 = 1180
bb = fm1937(xx5,:);
 xx1 = xx1a + zsamps;
xx1x = num2str(xx1);

minsamps = 1;                  %fm1937              1200:2100
maxsamps = 546;
xsamps = minsamps;
refsamps = maxsamps - minsamps;

offset = 20;        %from xx1a to the next as we sweep down....
offsetx = num2str(offset);
xmsamps = xsamps + refsamps;
xysamps = [xsamps:xmsamps];                                      %reffm2015
aa2 = aa((zsamps*offset)+minsamps:(zsamps*offset)+minsamps+(maxsamps-minsamps));
jan = (minsamps:maxsamps).*2*pi/maxsamps;
ja = .5.*(cos(-pi+jan)+1);     %hann function
 bb2 = bb(xysamps);                                              %sig
aa3 = aa(xsamps+(offset*(xx1-1)):xmsamps+(offset*(xx1-1)));      %offset refs
```

5-1

31

08/385442

```
bb3 = bb(xsamps+(offset*(xx1-1)):xmsamps+(offset*(xx1-1)));

zcor = xcorr(bb3,aa2);      % for phone 1 as ref.....
xx1
if xx1a == 1
   zcora = zcor;
end %xx1a
plot((1:max(size(zcor)))-refsamps,real(zcor)/max(real(zcora))-2*(xx5-1))
grid
axis([-400 400 -16 2])
hold on
pause(.001)
[x,y] = max(zcor)
yy1(xx5) = y;
zz = (y-yy1(1)).*.038;     % delay in msec
zz1(xx5) = zz;
xlabel(['xx1 = ' xx1x ' samps;  offset = ' offsetx '; samps; ' time2])

end
end
end
zzr = zz1.*1.5;   %m
zzdel = sprintf('%.2f ',zz1 );
zzrdel = sprintf('%.2f ',zzr );
samps1 = [min(xysamps) max(xysamps) ];
samps1a = sprintf('%.0f ',samps1 );
title(['sig samps= ' samps1a ';' ' del=' zzdel ' msec'])
deldifs = diff(zz1);
delrdifs = diff(zzr);
deldifx = sprintf('%.2f ',deldifs );
delrdifx = sprintf('%.2f ',delrdifs );
zz = ['deldifs= ' deldifx ' msec']
ylabel(zz)
grid
grid

timedelaysms = zz1       %time delays in msec
rangedelaysm = 1500*zz1/1000  %ranges in m
inpx = input('(Pause.  Hit to go...)')

clg
plot(1:7,zzr,'-',1:7,zzr,'x')
axis([0 10 -8 8])
grid
title(['sig samps= ' samps1a ';' ' Rangedel=' zzrdel ' m'])
ylabel([rfile2 'delrdifs= ' delrdifx ' m'])
xlabel(['xx1 = ' xx1x ' samps;  offset = ' offsetx '; samps; ' time2])
```

5-2
32

08/385442

```
%pa2xfm.m Program

figure(1)
clg

%    FM Chirp Range Delay Measurements for PLS FMPL.
%  This shows that fm chirps yeild relative ranges between
%  phones or absolute ranges if the replica chirp is timed
%  absolutely by either an rf transmission, or a stable
%  oscillator clock sufficient for less than a msec error (1
%  msec gives about 1.5 m underwater).  This assumes a rough
%  timing or the replica overlaps the received fm pulse.  The
%  actual underwater received fm signal is saved here in file
%  as fm1937 and the overlapped replica is saved as chirpr.
%  With this program, load fm1937 (data) and load chirpr
%  (replica), then start this program.  The output is the
%  correlation functions for the 8 phones in this case in
%  msec. on the first graphic.  Then, the range delays in
%  meters are given in the second graphic.  The range delay
%  vector is output in the command window.  Cut-and-paste
%  the range delay vector for two sources into #5 files.
%  Operate with these range delays for FMPL just as in CPL
%  in that this file is entered into program for array phone
%  x-y iteration location maps.  Wideband noise also works for
%  input range delay measurements.
%       This measures of time delays on channels, then plots
%  the range delays associated with each.  Two such computes
%  and vectors are entered into x-y iteration mapping program.

figure(1)
clg
%========================================================================
tim = fix(clock);
tim = fix(clock);  day = tim(3);  ds = num2str(day);mo = tim(2);
mos = num2str(mo);  yr = tim(1);  yrs = num2str(yr);
date = ['d' ds '-' mos '-' yrs];
timehr = tim(4);  xtimehr = num2str(timehr);
timemin = tim(5);  xtimemin = num2str(timemin);
time2 = [date ' ' xtimehr ':' xtimemin];
disp('')
disp('')
timex =['acov7MJCx5..........................;    ' time2];
disp(timex)
%.......................................................
clear zzdel yy1 zz1

%inp2x1 = input('(Enter to load sig file ; eg fm1925..type 1925)')
inp2x1 = 1937
if inp2x1 ~= []
    rfile2 = sprintf('fm%.0f ',inp2x1 );
end
inx = inp2x1;
zsamps = 59;    %offset in ref lengths....put to 0 normally

for xx1a = 1%1:100
for xx5 = 1:7;
xx5 = xx5
xx4 = 1;
aa = fm1937(xx4,:);            %59x20 = 1180
bb = fm1937(xx5,:);
 xx1 = xx1a + zsamps;
xx1x = num2str(xx1);

minsamps = 1;                %fm1937            1200:2100
maxsamps = 546;
xsamps = minsamps;
refsamps = maxsamps - minsamps;

offset = 20;        %from xx1a to the next as we sweep down....
offsetx = num2str(offset);
xmsamps = xsamps + refsamps;
xysamps = [xsamps:xmsamps];
                                                          %reffm2015
aa2 = aa((zsamps*offset)+minsamps:(zsamps*offset)+minsamps+(maxsamps-minsamps));
jan = (minsamps:maxsamps).*2*pi/maxsamps;
ja = .5.*(cos(-pi+jan)+1);    %hann function
 bb2 = bb(xysamps);
                                                          %sig
aa3 = aa(xsamps+(offset*(xx1-1)):xmsamps+(offset*(xx1-1)));    %offset refs
```

5-3

33

08/385452

```
bb3 = bb(xsamps+(offset*(xx1-1)):xmsamps+(offset*(xx1-1)));

zcor = xcorr(bb3,aa2);     % for phone 1 as ref.....
xx1
if xx1a == 1
   zcora = zcor;
end %xx1a
plot((1:max(size(zcor)))-refsamps,real(zcor)/max(real(zcora))-2*(xx5-1))
grid
axis([-400 400 -16 2])
hold on
pause(.001)
[x,y] = max(zcor)
yy1(xx5) = y;
zz = (y-yy1(1)).*.038;     % delay in msec
zz1(xx5) = zz;
xlabel(['xx1 = ' xx1x ' samps;  offset = ' offsetx '; samps; ' time2])

end
end
end
zzr = zz1.*1.5;   %m
zzdel = sprintf('%.2f ',zz1 );
zzrdel = sprintf('%.2f ',zzr );
sampsl = [min(xysamps) max(xysamps) ];
sampsla = sprintf('%.0f ',sampsl );
title(['sig samps= ' sampsla ';' ' del=' zzdel ' msec'])
deldifs = diff(zz1);
delrdifs = diff(zzr);
deldifx = sprintf('%.2f ',deldifs );
delrdifx = sprintf('%.2f ',delrdifs );
zz = ['deldifs= ' deldifx ' msec']
ylabel(zz)
grid
grid

timedelaysms = zz1       %time delays in msec
rangedelaysm = 1500*zz1/1000  %ranges in m
inpx = input('(Pause.  Hit to go...)')

clg
plot(1:7,zzr,'-',1:7,zzr,'x')
axis([0 10 -8 8])
grid
title(['sig samps= ' sampsla ';' ' Rangedel=' zzrdel ' m'])
ylabel([rfile2 'delrdifs= ' delrdifx ' m'])
xlabel(['xx1 = ' xx1x ' samps;  offset = ' offsetx '; samps; ' time2])
```

5-4
34

What is claimed is:

1. A method for determining the two-dimensional relative physical locations of a plurality of sensors comprising the steps of:

receiving first and second reference signals at said sensors from first and second sources, respectively, the locations of said first and second sources being unknown;

calculating delays associated with said first and second reference signals; and analyzing said delays to determine the two-dimensional relative physical location of said sensors.

2. A method of locating sensors as defined in claim 1, wherein receiving comprises A/D conversion.

3. A method of locating sensors as defined in claim 1, wherein calculating includes FFT analysis.

4. A method of locating sensors as defined in claim 1, wherein analyzing comprises:

calculating initial sensor position estimates;

evaluating said estimates using a constraint; and iteratively improving said estimates.

5. A method of locating sensors as defined in claim 1, wherein analyzing includes calculating a range-delay vector for each of the two sources.

6. A method of locating sensors as defined in claim 1, wherein analyzing involves iteration.

7. A method of locating sensors as defined in claim 1, wherein analyzing involves solving a set of simultaneous equations, wherein the variables in said equations are two range-delay vectors and two bearings to the sources.

8. A method of locating sensors as defined in claim 1 wherein said first and second reference signals are FM chirps.

9. A method of locating sensors as defined in claim 1 wherein said first and second reference signals are sinusoidal.

10. A method of locating sensors as defined in claim 1 wherein said first and second reference signals are wideband noise signals of the type generated by a passing ship, boat, or other pseudo-random source.

11. A method of determining the two-dimensional relative locations of a plurality of sensors comprising the steps of:

determining distances between each sensor and a first reference source of unknown location;

determining distances between each sensor and a second reference source of unknown location;

determining bearings between said sensors and said references sources; and determining the two-dimensional relative locations of said sensors.

12. A method of determining the locations of sensors as defined in claim 11, wherein said distance determining steps involve determination of phase differences between sinusoidal signals received by said transducers.

13. A method of determining the locations of sensors as defined in claim 11, wherein said distance determining steps involve determination of time delays between signals received by said transducers.

14. An apparatus for determining the two-dimensional relative locations of a plurality of sensors comprising:

a sampler sampling signals received by said sensors, including first and second calibration signals received from sources of unknown location; and a computer adapted to analyze said first and second calibration signals to determine the two-dimensional relative locations of said sensors to an accuracy of better than about one tenth of the wavelength of the highest frequency convened by said sampler.

15. An apparatus as defined in claim 14 wherein said sensors comprise underwater microphones.

16. An apparatus as defined in claim 14 wherein said sensors comprise electromagnetic detectors.

17. An apparatus as defined in claim 14 wherein said first and second calibration signals are FM chirps.

18. An apparatus as defined in claim 14 wherein said first and second calibration signals are sinusoidal.

19. A method of locating sensors as defined in claim 14 wherein said first and second calibration signals are wideband noise signals of the type generated by a passing ship, boat, or other pseudo-random source.

20. An apparatus as defined in claim 14 wherein said sampler comprises an A/D converter.

21. An apparatus as defined in claim 14 wherein said sampler comprises an analog sampler, such as a CCD.

22. An apparatus as defined in claim 14 wherein said signal analyzer comprises memory elements for storing said sampled sensor signals.

* * * * *